US009225401B2

(12) United States Patent
Wang

(10) Patent No.: US 9,225,401 B2
(45) Date of Patent: *Dec. 29, 2015

(54) METHOD AND APPARATUS OF BEAM TRAINING FOR MIMO OPERATION AND MULTIPLE ANTENNA BEAMFORMING OPERATION

(71) Applicant: MEDIATEK Singapore Pte. Ltd., Singapore (SG)

(72) Inventor: James June-Ming Wang, San Marino, CA (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 14/709,426

(22) Filed: May 11, 2015

(65) Prior Publication Data

US 2015/0244432 A1 Aug. 27, 2015

Related U.S. Application Data

(63) Continuation-in-part of application No. 13/899,540, filed on May 21, 2013, now Pat. No. 9,048,894.

(60) Provisional application No. 61/650,220, filed on May 22, 2012.

(51) Int. Cl.
H04B 7/02 (2006.01)
H04B 7/04 (2006.01)
(Continued)

(52) U.S. Cl.
CPC .............. *H04B 7/043* (2013.01); *H04B 7/0632* (2013.01); *H04B 7/0695* (2013.01); *H04B 7/088* (2013.01); *H04J 11/0063* (2013.01)

(58) Field of Classification Search
CPC ...... H04B 7/043; H04B 7/088; H04B 7/0417; H04B 7/0695; H04B 7/0669; H04L 1/0618; H04L 1/06; H04L 25/0204
USPC .......................... 375/267, 260, 259, 295, 316
See application file for complete search history.

(56) References Cited

U.S. PATENT DOCUMENTS

| 8,280,445 B2 | 10/2012 | Yong et al. .................. 455/562.1 |
| 2006/0264184 A1 | 11/2006 | Li et al. .......................... 455/101 |

(Continued)

OTHER PUBLICATIONS

Su-Khiong (SK) Yong et al. 60 GHz Technology for GBPS WLAN and WPAN, from Theory to Practice, 2011, chapter 4, p. 89-115.

(Continued)

*Primary Examiner* — Zewdu Kassa
(74) *Attorney, Agent, or Firm* — Imperium Patent Works; Zheng Jin

(57) ABSTRACT

The disclosed invention provides an efficient method for MIMO beam training for multiple antennas to enable spatial multiplexing MIMO operation and spatial combining in a wireless network. The invention discloses a simple and efficient beam-training algorithm and protocol for MIMO operation that operates in high SNR condition for reliable MIMO operation. In one novel aspect, the best MIMO beam combinations are determined after TX sector sweeping and RX sector sweeping. The best MIMO beam combinations are determined in such a way that no any selected TX/RX sectors come from the same TX/RX antenna/beamformer. The selection criteria includes not only signal quality, but also considers mutual interference and leakage among multiple MIMO spatial streams to improve overall MIMO performance. Simultaneous RX or TX training are also supported to reduce training time.

26 Claims, 16 Drawing Sheets

(51) Int. Cl.
  *H04B 7/06* (2006.01)
  *H04B 7/08* (2006.01)
  *H04J 11/00* (2006.01)

(56) References Cited

U.S. PATENT DOCUMENTS

| | | | |
|---|---|---|---|
| 2007/0230639 A1 | 10/2007 | Stirling-Gallacher | 375/347 |
| 2010/0056062 A1 | 3/2010 | Zhang et al. | 455/63.1 |
| 2010/0157955 A1 | 6/2010 | Liu et al. | 370/336 |
| 2010/0214169 A1 | 8/2010 | Kafle | 342/368 |
| 2010/0215027 A1 | 8/2010 | Liu et al. | 370/338 |
| 2010/0265895 A1 | 10/2010 | Bracha | 370/329 |
| 2010/0265922 A1 | 10/2010 | Bracha | 370/336 |
| 2010/0265924 A1 | 10/2010 | Yong et al. | 370/336 |
| 2011/0317630 A1 | 12/2011 | Zhu et al. | 370/329 |
| 2013/0272263 A1 | 10/2013 | Pi et al. | 370/330 |

OTHER PUBLICATIONS

USPTO, Notice of Allowance for related U.S. Appl. No. 14/699,789 dated Sep. 22, 2015 (21 pages).

METHOD AND APPARATUS OF BEAM TRAINING FOR MIMO OPERATION AND MULTIPLE ANTENNA BEAMFORMING OPERATION

CROSS REFERENCE TO RELATED APPLICATIONS

This application is a continuation-in-part of, and claims priority under 35 U.S.C. §120 from nonprovisional U.S. patent application Ser. No. 13/899,540, entitled "Method and Apparatus of Beam Training for MIMO Operation," filed on May 21, 2013, the subject matter of which is incorporated herein by reference. Application Ser. No. 13/899,540, in turn, claims priority under 35 U.S.C. §119 from U.S. Provisional Application No. 61/650,220, entitled "Method and Apparatus for Beam Training for MIMO Operation," filed on May 22, 2012, the subject matter of which is incorporated herein by reference.

TECHNICAL FIELD

The disclosed embodiments relate generally to wireless network communications, and, more particularly, to beam training methods for multiple-input multiple-output (MIMO) operation and for multiple antenna beamforming operation.

BACKGROUND

Spatial multiplexing multiple input and multiple output (MIMO) technique is used to increase the data rate (and spectral efficiency) by transmitting multiple data streams via different spatial paths simultaneously. Spatial combining technique, on the other hand, refers to the technique that combines the same data stream via different spatial paths to enhance signal quality. Spatial multiplexing and spatial combining techniques have been widely employed in mobile communications systems such as IEEE 802.11n (2.4 GHz and 5 GHz) and IEEE 802.11ac (5 GHz). For 802.11n and 802.11ac, the signal wavelength is large comparing to the feature size of objects in the propagation environment. As a result, NLOS signal propagation is dominated by the signal scattering from various objects. Due to the severe scattering, OFDM signal is often used in such systems and the spatial multiplexing and spatial combining are done on a per-tone (per-subcarrier) basis in the digital domain.

For higher frequency systems such as IEEE 802.11ad (60 GHz), the signal propagation characteristics change as the signal wavelength becomes small comparing to the feature size of objects in the propagation environment. As a result, signal propagation is dominated by ray-like propagation with discrete paths in space. The signal quality can be greatly enhanced if either TX or RX antenna beams or both TX and RX antenna beams are directed toward strong spatial signal path. The improved signal quality via aligning the antenna beams with strong spatial signal path manifests both increased signal strength (higher signal-to-noise ratio) and reduced delay spread. Since the delay spread is reduced, spatial combining can be wholly or partially done in RF domain (instead of digital domain) to simplify implementation.

In general, phased-array antenna with steerable antenna beam in MIMO operation provides antenna gain and enables mobility. Eigen-beamforming is one method of antenna beam training. The Eigen-beamforming requires transmitter and receiver to estimate the channel response matrix first. The channel response matrix is then decomposed using singular value decomposition (SVD). The MIMO operation uses n dominant Eigen modes (corresponding to n spatial paths) for transmitting n spatial streams. The Eigen beamforming method suffers from the problem that the channel response matrix is obtained in lower signal-to-noise condition since no beamforming is used during the channel estimation. Additionally, Eigen beamforming is generally performed in frequency domain employing OFDM signal.

Another method of antenna beam training is multi-stage iterative training using power method. In the power method, the receiver sends back the normalized receive vector in the n antennas to the transmitter. The transmitter uses the receive vector as the next transmit antenna weight. The antenna weight quickly converges to the first Eigen vector after a few iterations. This process continues until the n vectors (antenna weight vectors) are obtained. The power method suffers from the problem that it only works (converges) in the presence of high signal-to-noise ratio.

The beam training protocol provided in IEEE 802.11ad involves either transmitter or receiver to sweep through a number of antenna beam directions to determine the beam with the best signal quality. For efficient beam training, multiple stages of beam training are provided. The initial stage, called the SLS (sector level sweep), provides coarse antenna beam training. The subsequent stage, called the beam refinement protocol or beam tracking, provides the fine-tuning of antenna beam for improved pointing accuracy and higher signal quality. These beam training protocols are generally used to train a single spatial beam for the transmission of a single data stream.

A solution is sought for training multiple antenna beam combinations to allow for multiple data streams for increased data rate, or to allow combining of the same data stream for enhanced signal quality.

SUMMARY

The disclosed invention provides an efficient method for beam training to enable spatial multiplexing MIMO operation and spatial combining in a wireless network. The invention discloses a simple and efficient beam-training algorithm and protocol for MIMO operation that operates in high SNR condition for reliable MIMO operation without the drawbacks of prior art methods.

In a first embodiment, an initiator and a responder exchange beam-training parameters to start a MIMO training procedure. During TX sector sweeping, the initiator sends training packets through all TX sectors, while the responder receives the training packets with omni-direction beam. The responder sends back a set of selected TX sectors with good received signal quality and the corresponding channel measurements. During RX sector sweeping, the initiator sends training packet with omni-direction beam, while the responder receives the training packets through all RX sectors. The responder determines a set of selected RX sectors with good received signal quality. During beam combination training, the initiator and the responder sweep through the selected TX sectors and RX sectors together. The responder determines the best MIMO beam combinations for multiple MIMO spatial streams based on SNIR and sends back to the initiator. Alternatively, the responder sends the channel measurements to the initiator that selects the MIMO combination. Finally, beam refinement is performed to fine-tune the antenna beams for improved signal quality. In one novel aspect, the leakage from one spatial stream into the receive beam of another spatial stream is considered as interference for SNIR calculation.

In a second embodiment, an initiator and a responder exchange beam-training parameters to start a MIMO training procedure. During TX sector sweeping, the initiator sends training packets through all TX sectors, while the responder receives the training packets with omni-direction beam. The responder sends back a set of selected TX sectors with good received signal quality and the corresponding channel measurements. During RX sector sweeping, the initiator sends training packet using each selected TX sector, while the responder receives the training packets through all RX sectors. The responder selects one RX sector with good received signal quality for each selected TX sector. The responder determines the best MIMO beam combinations for multiple MIMO spatial streams based on SNIR and sends back to the initiator. Alternatively, the responder sends the channel measurements to the initiator that selects the MIMO beam combinations. Finally, beam refinement is performed to fine-tune the antenna beams for improved signal quality. In one novel aspect, the leakage from one spatial stream into the receive beam of another spatial stream is considered as interference for SNIR calculation.

In multiple antenna beamforming operation, simultaneous transmission and reception of multiple streams (spatial multiplexing) are supported. In one example, each spatial stream is transmitted from a TX sector of a TX antenna to an RX sector of a RX antenna and different spatial streams are transmitted from different TX antenna and received by different RX antenna. Thus, each MIMO combination consists of select N TX sectors and N RX sectors for transmitting N spatial streams. The selected N TX sectors are from N different TX antennas, and the selected RX sectors are from N RX antenna. In another example, each spatial stream is transmitted from a TX beamformer to an RX beamformer and different spatial streams are transmitted from different TX beamformer and received by different RX beamformer. Thus, each MIMO combination consists of select N TX sectors and N RX sectors for transmitting N spatial streams. The selected N TX sectors are from N different TX beamformers, and the selected RX sectors are from N RX beamformers. The selection criteria includes not only signal quality, but also considers mutual interference and leakage among multiple MIMO spatial streams to improve overall MIMO performance. Simultaneous RX and/or TX training are also supported to reduce training time.

Other embodiments and advantages are described in the detailed description below. This summary does not purport to define the invention. The invention is defined by the claims.

DETAILED DESCRIPTION

Figure 1:
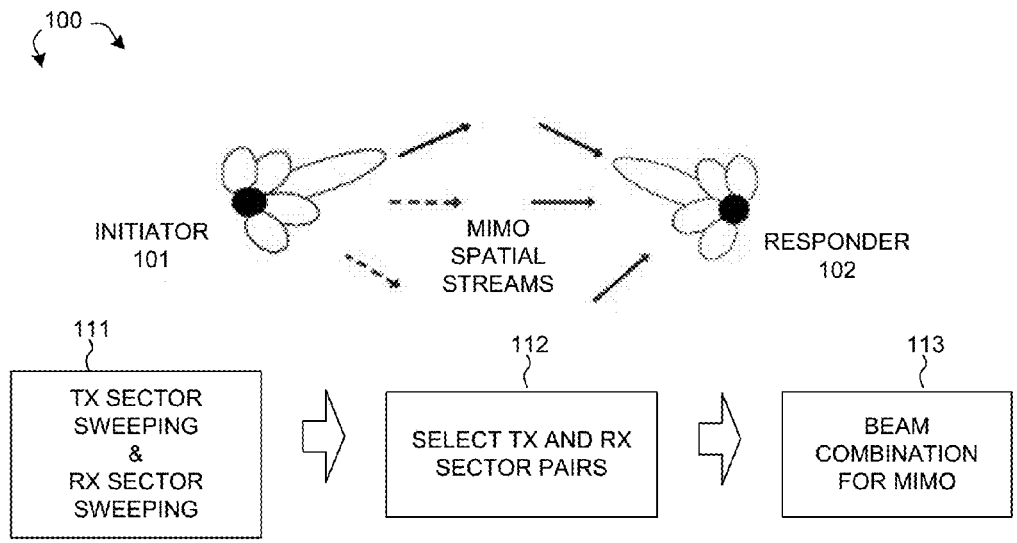
FIG. 1 illustrates a MU-MIMO operation with antenna beam training for multiple spatial streams in a wireless system in accordance with one novel aspect.

Reference will now be made in detail to some embodiments of the invention, examples of which are illustrated in the accompanying drawings. FIG. 1 illustrates a MU-MIMO operation with antenna beam training for multiple spatial streams in a wireless system 100 in accordance with one novel aspect. Wireless system 100 comprises an initiator 101 and a responder 102. Both initiator 101 and responder 102 are equipped with antenna arrays to support MIMO operation for multiple spatial streams. To enable MIMO operation, initiator 101 signals to responder 102 to start a MIMO training with a list of MIMO training parameters. The purpose of MIMO training is for antenna array beamforming, where both transmitting antennas and receiving antennas are steered with the best beam combinations to increase data rate and enhance signal quality.

In the example of FIG. 1, the intended direction is initiator 101 is the transmitter of MIMO signal and responder 102 is the receiver of MIMO signal. Note that an initiator can also initiate a MIMO training in which the initiator is the receiver of MIMO signal. In step 111, initiator 101 performs TX sector sweeping, where training packets are transmitted to responder 102 through the TX sectors, each sector corresponds to a specific TX antenna beam/pattern (e.g., direction/weight). During RX sector sweeping, training packets are transmitted from initiator 101 to responder 102, which sweeps through the RX sectors, each sector corresponds to a specific RX antenna beam/pattern (e.g., direction/weight). In step 112, responder 102 records the received signal quality (e.g., signal-to-noise ratio (SNR)) and determines a number of beam combinations (selected TX and RX sector pairs) based on the results of TX sector sweep and RX sector sweep. The number of beam combinations needs to be greater or equal to the number of spatial streams. In step 113, from the selected TX and RX sector pairs, responder 102 determines the best MIMO beam combinations for the multiple MIMO spatial streams based on signal-to-(noise+interference) ratio (SNIR) criteria.

In one novel aspect, the simple and efficient beam training method operates in high SNR condition for reliable operation. Furthermore, by considering mutual interference or leakage among the multiple MIMO spatial streams, the MIMO beam combination selection is more accurate to improve overall MIMO performance.

Figure 2:
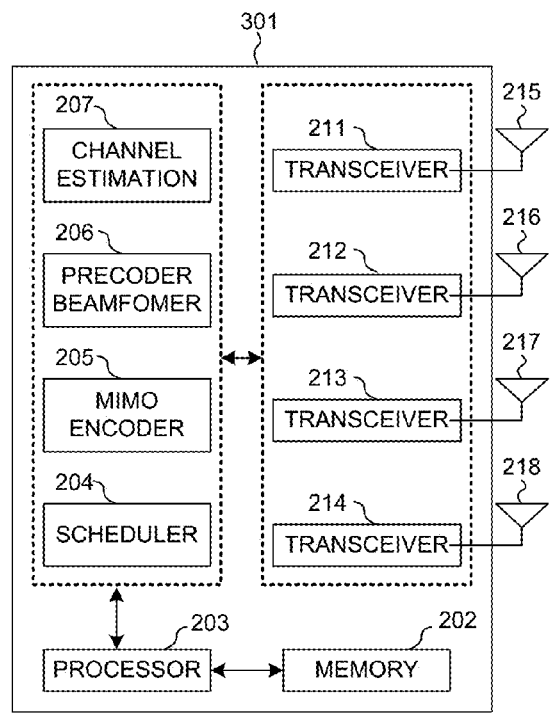
FIG. 2 illustrates a simplified block diagram of a wireless device in a wireless system in accordance with one novel aspect.

FIG. 2 illustrates a simplified block diagram of a wireless device 201 in a wireless system in accordance with one novel aspect. Wireless device 201 comprises memory 202, a processor 203, a scheduler 204, a MIMO encoder 205, a beamformer/precoder 206, a channel estimation module 207, and a plurality of transceivers 211-214 coupled to a plurality of antennas 215-218, respectively. The wireless device receives RF signals from the antenna, converts them to baseband signals and sends them to the processor. RF transceiver also converts received baseband signals from the processor, converts them to RF signals, and sends out to the antenna. Processor 203 processes the received baseband signals and invokes different functional modules to perform features in the device. Memory 202 stores program instructions and data to control the operations of the device. In one embodiment, the transceivers are a type of transmit and receive frontend electronics. FIG. 2 further illustrates functional modules in the wireless device that carry out embodiments of the current invention, which includes a scheduler 204, a MIMO encoder/decoder 205, a MIMO precoder/beamformer 206, and a channel estimation module 207.

Figure 3:
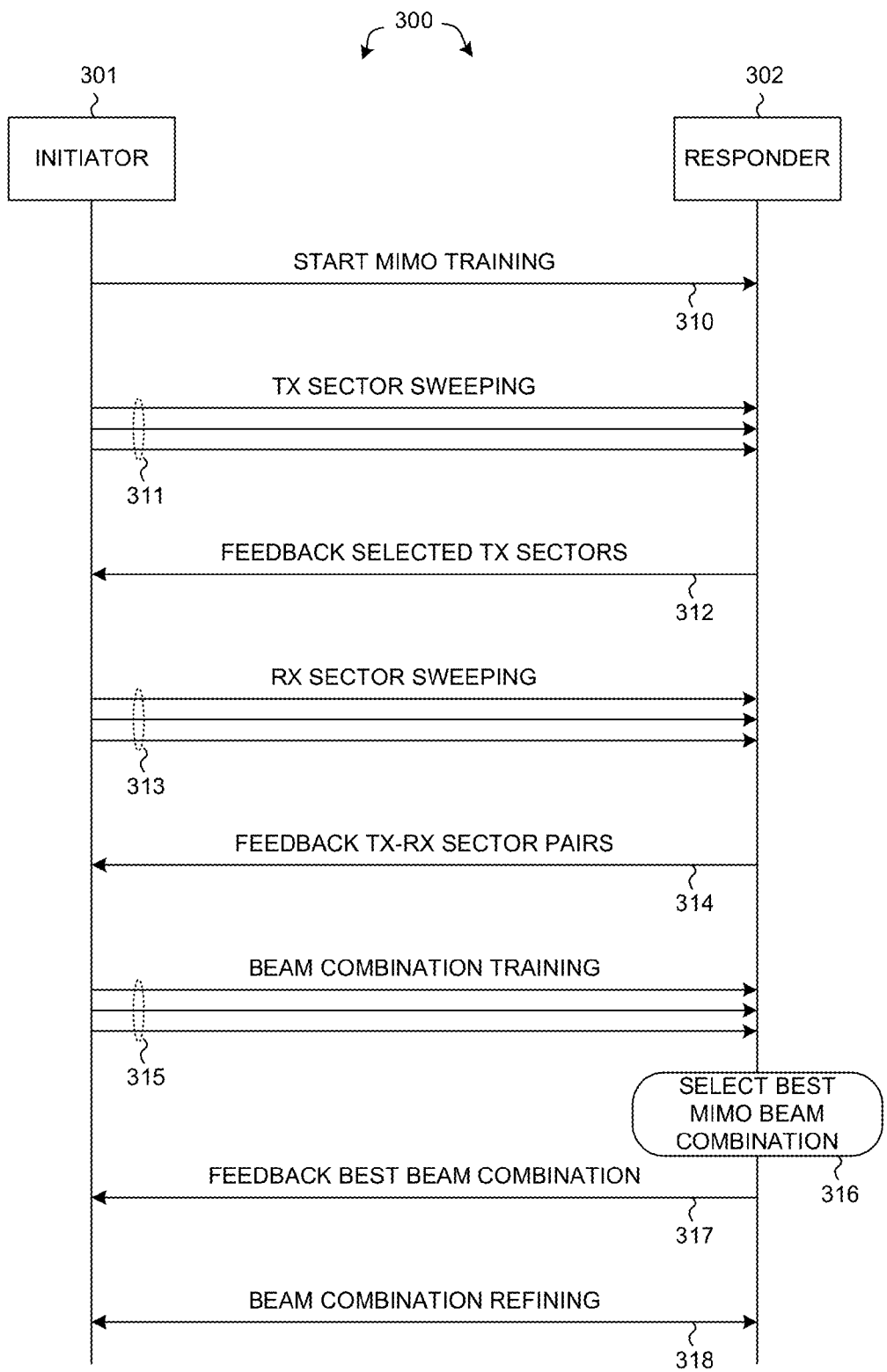
FIG. 3 illustrates a message/signal exchange flow of a first embodiment of antenna beam training for MIMO operation.

FIG. 3 illustrates a message/signal exchange flow of a first embodiment of antenna beam training for MIMO operation in a wireless communications system 300. Wireless communications system 300 comprises an initiator 301 and a responder 302. In step 310, the initiator sends a MIMO beam-training message to the responder to start a MIMO training procedure. The beam-training message comprises MIMO training parameters such as the number of TX sectors, the number of RX sectors, the number of MIMO spatial streams, the number of candidate beam combinations, and other relevant parameters. For example, the duration and timing of training packets may be included as part of the parameters. In the example of FIG. 3, the initiator is the transmitter of MIMO signal. However, an initiator can also initiate a MIMO training in which it is the receiver of MIMO signal.

In step 311, during TX sector sweeping, initiator 301 starts sending training packets to responder 302. Each training packet is a short packet designed for beam training—allowing the receiver to measure the received signal quality, but not carrying extra data payload to reduce time. For TX sector sweeping, the training packets are sent through all the TX sectors—one packet per sector with a gap (inter-frame spacing) between consecutive training packets. Responder 302 receives the training packets with an omni-direction antenna pattern and records the received signal quality for each TX sector. In step 312, responder 302 feedbacks a set of selected TX sectors with good received signal quality to initiator 301. In step 313, RX sector sweeping is performed. Initiator 301 transmits training packets with a semi-omni antenna pattern while responder 302 sweep through all the RX sectors with dwell time of each RX sector corresponding to the training packet duration and timing. Responder 302 again records the received signal quality for each RX sector. In step 314, responder 302 optionally feedbacks the candidate beam combinations (e.g., a list of TX-RX sector pairs) to initiator 301. Based on the results of TX sector sweep and RX sector sweep, the selection of RX sectors is based on signal quality (e.g., SNR).

In step 315, the initiator and the responder start sweeping the selected TX sectors and the selected RX sectors together for beam combination training. During the beam combination training, the initiator transmits a training packet through one of the selected TX sectors while the responder receives the training packet through the paired RX sector in one beam combination. Because the initiator already knows the selected TX-RX sector pairs, it knows how many times to send the training packets for each selected TX sector. In an alternative embodiment, the responder might not feedback the beam combinations in step 314. As long as the initiator knows the number of candidate beam combinations, it still knows how many times to send the training packets for each selected TX sector for beam combination training. The responder records the signal quality for each selected TX-RX sector pair during the beam combination training.

In step 316, responder 302 determines the best MIMO beam combinations for the multiple MIMO spatial streams. If there are two MIMO spatial streams, then two best MIMO beam combinations are determined. For spatial multiplexing, the best MIMO beam combinations are determined based on the highest SNIR. For spatial combining, the best MIMO beam combinations are determined based on the highest total combined power (SUM power). In step 317, responder 302 feedbacks the best MIMO beam combinations to initiator 301. Finally, in step 318, initiator 301 and responder 302 perform beam refinement, which fine-tunes the antenna beams for improved pointing accuracy and higher signal quality. More details of the first MIMO training embodiment are now described below accompanied with FIGS. 4A-4C.

Figure 4A:
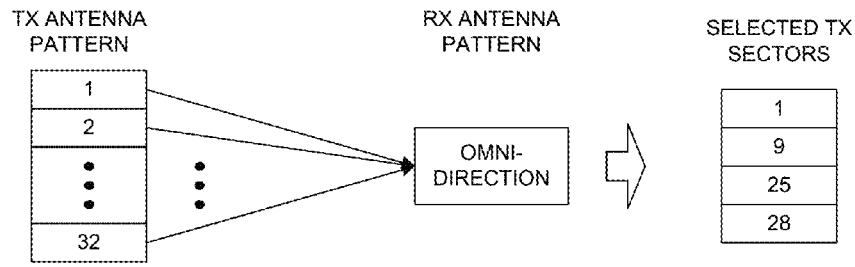
FIG. 4A illustrates a first step of the first embodiment of antenna beam training.

FIG. 4A illustrates a first step of the first embodiment of antenna beam training. The first step involves TX sector sweeping after initializing a MIMO training between an initiator and a responder. In the example of FIG. 4A, the initiator transmits training packets through total thirty-two (32) TX sectors—sectors 1 to 32. The responder receives the training packets with an omni-direction beam. The responder then selects four TX sectors with the best signal quality (e.g., TX sectors 1, 9, 25, and 28). The responder also sends the selected TX sectors back to the initiator.

Figure 4B:
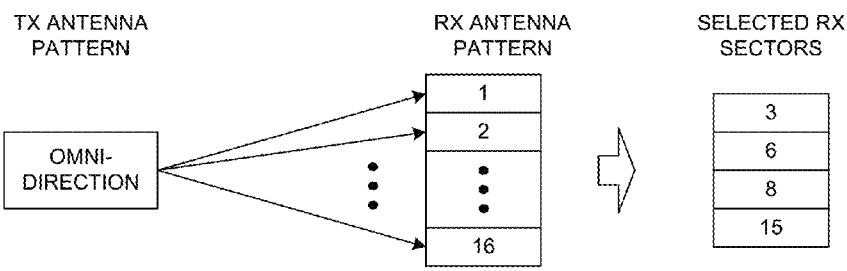
FIG. 4B illustrates a second step of the first embodiment of antenna beam training.

FIG. 4B illustrates a second step of the first embodiment of antenna beam training. The second step involves RX sector sweeping. In the example of FIG. 4B, the initiator transmits training packets using an omni-direction beam to the responder, while the responder receives the training packets sweeping through total sixteen (16) RX sectors—sectors 1 to 16. The responder then selects four RX sectors with the best signal quality (e.g., RX sectors 3, 6, 8, and 15).

Figure 4C:
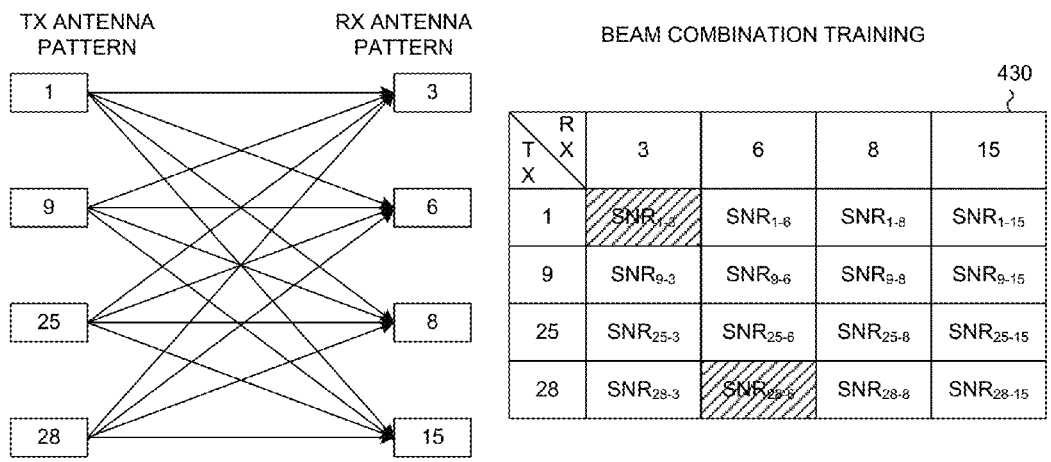
FIG. 4C illustrates a third step of the first embodiment of antenna beam training.

FIG. 4C illustrates a third step of the first embodiment of antenna beam training. The third step involves beam combination training using the selected TX sectors and the selected RX sectors. In the example of FIG. 4C, the initiator transmits training packets sweeping through the selected TX sectors (1, 9, 25, and 28), while the responder receives the packets sweeping through the selected RX sectors (3, 6, 8, and 15). The responder then records the signal quality (SNR) for all sixteen (4 TX sectors×4 RX sectors=16) beam combinations, as depicted by table 430.

The best MIMO beam combinations for multiple MIMO spatial streams are selected from the sixteen beam combinations. The best beam combination typically means the highest signal quality (SNR). However, in order to select the best beam combinations for multiple spatial streams, the selection criteria needs to include the interference or leakage between the spatial streams. Suppose TX1-RX3 sector pair and TX28-RX6 sector pair are selected as the MIMO beam combinations for two MIMO spatial streams SS1 and SS2, respectively. The received signal power from TX1 to RX6 becomes the interference to the TX28-RX6 pair, and the received signal power from TX28 to RX3 becomes the interference to the TX1-RX3 pair. After considering the mutual interference or leakage, the responder determines the best two beam combinations for two spatial streams.

Figure 5:
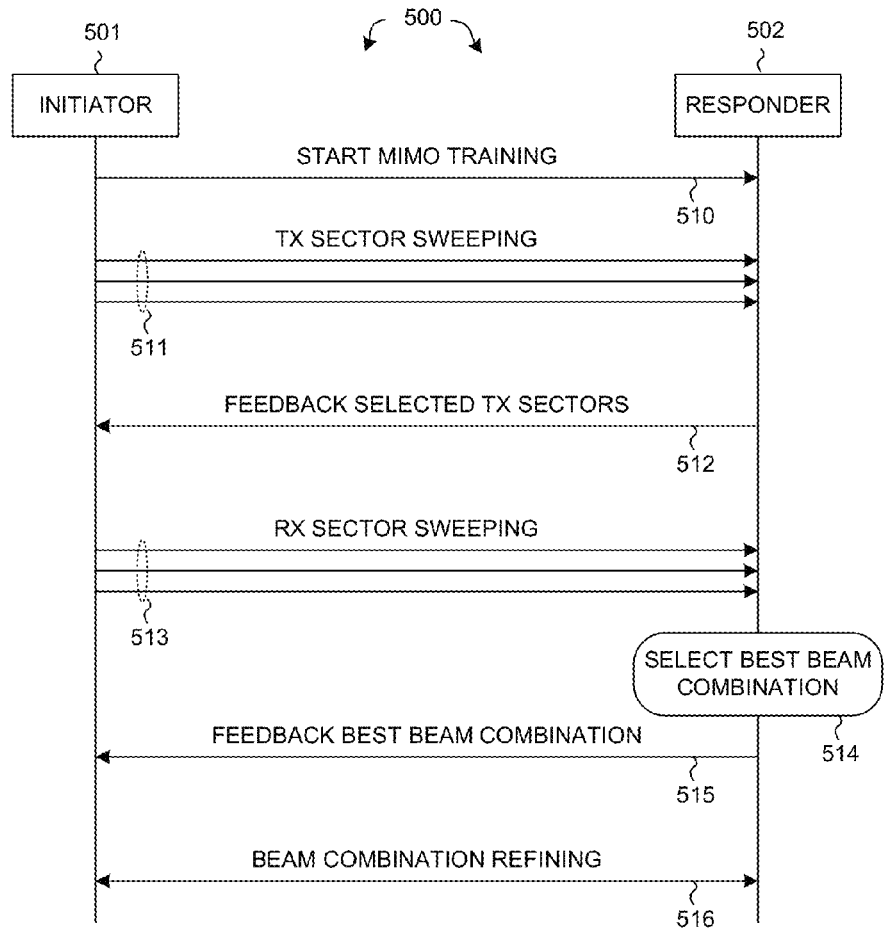
FIG. 5 illustrates a message/signal exchange flow of a second embodiment of antenna beam training for MIMO operation.

FIG. 5 illustrates a message/signal exchange flow of a second embodiment of antenna beam training for MIMO operation in a wireless communications system 500. Wireless communications system 500 comprises an initiator 501 and a responder 502. In step 510, the initiator sends a MIMO beam-training message to the responder to start a MIMO training procedure. The beam-training message comprises MIMO training parameters such as the number of TX sectors, the number of RX sectors, the number of MIMO spatial streams, the number of candidate beam combinations, and other relevant parameters. For example, the duration and timing of training packets may be included as part of the parameters. In the example of FIG. 5, the initiator is the transmitter of MIMO signal. However, an initiator can also initiate a MIMO training in which it is the receiver of MIMO signal.

In step 511, during TX sector sweeping, initiator 501 starts sending training packets to responder 502. Each training packet is a short packet designed for beam training—allowing the receiver to measure the received signal quality, but not carrying extra data payload to reduce time. For TX sector sweeping, the training packets are sent through all the TX sectors—one packet per sector with a gap (inter-frame spacing) between consecutive training packets. Responder 502 receives the training packets with omni-direction antenna pattern and records the received signal quality for each TX sector. In step 512, responder 502 feedbacks a set of selected TX sectors with good received signal quality to initiator 501. In step 513, RX sector sweeping is performed. In the second embodiment, instead of using omni-direction beam for transmitting training packets, initiator 501 transmits through one of the selected TX sectors a number of training packets (corresponding to the number of RX sectors to be swept), while responder 502 sweeps through all the RX sectors. The initiator repeats this process for each selected TX sector while the responder sweeps through all the RX sectors for each selected TX sector. The dwell time of each RX sector corresponds to a training packet duration and timing. Responder 502 again records the received signal quality and selects one RX sector with good signal quality for each selected TX sector.

In step 514, responder 502 determines the best MIMO beam combinations for multiple MIMO spatial streams based on the results of the TX sector sweeping and the RX sector sweeping. No additional beam combination training is necessary in the second embodiment. If there are two MIMO spatial streams, then the two best MIMO beam combinations are determined. For spatial multiplexing, the best MIMO beam combinations are determined based on the highest SNIR. For spatial combining, the best MIMO beam combinations are determined based on the highest total combined power (SUM power). In step 515, responder 502 feedbacks the best MIMO beam combinations to initiator 501. Finally, in step 516, initiator 501 and responder 502 perform beam combination refining, which fine-tunes the antenna beams for improved pointing accuracy and higher signal quality. More details of the second MIMO training embodiment are now described below accompanied with FIGS. 6A-6B.

Figure 6A:
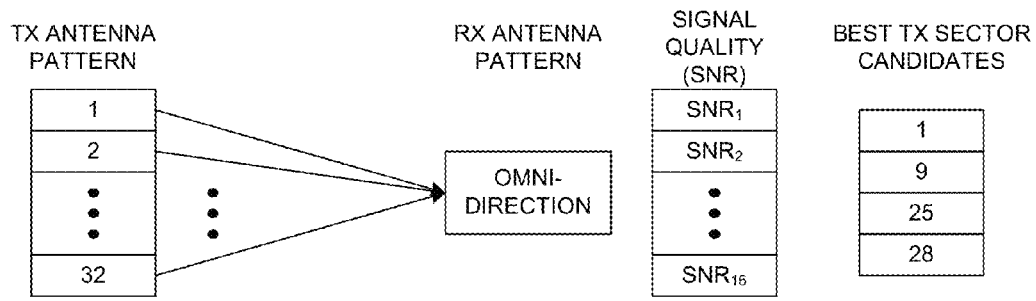
FIG. 6A illustrates a first step of the second embodiment of antenna beam training.

FIG. 6A illustrates a first step of the second embodiment of antenna beam training. The first step involves TX sector sweeping after initializing a MIMO training between an initiator and a responder. In the example of FIG. 6A, which is similar to FIG. 4A of the first embodiment, the initiator transmits training packets through total thirty-two (32) TX sectors—sectors 1 to 32. The responder receives the training packets with an omni-direction beam. The responder then selects four TX sectors with the best signal quality (e.g., TX sectors 1, 9, 25, and 28). The responder also sends the selected TX sectors back to the initiator.

Figure 6B:
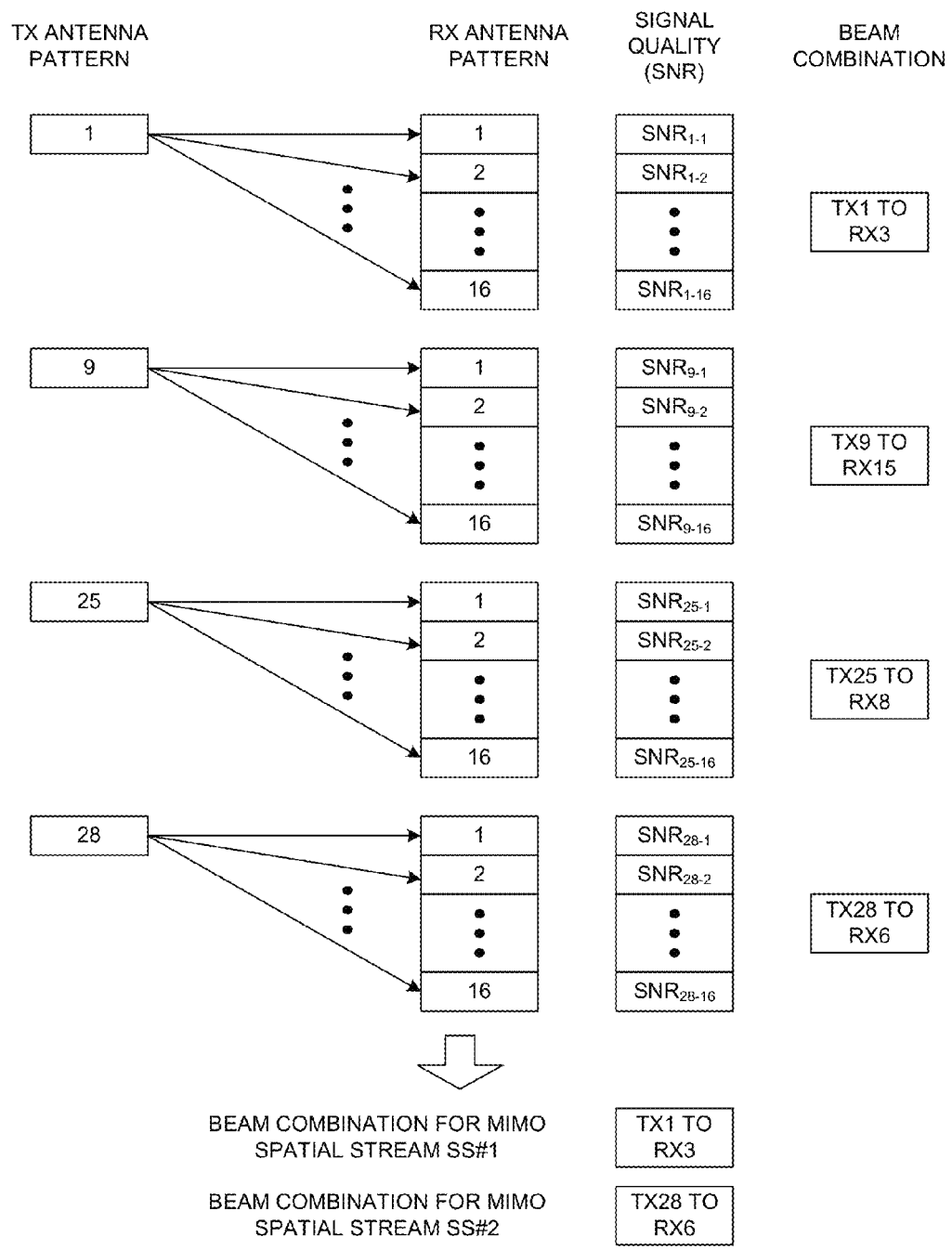
FIG. 6B illustrates a second step and a third step of the second embodiment of antenna beam training.

FIG. 6B illustrates a second step and a third step of the second embodiment of antenna beam training. The second step involves RX sector sweeping. In the example of FIG. 6B, the initiator transmits training packets using each of the selected TX sector (1, 9, 25, and 28) to the responder, while the responder receives the training packets sweeping through total sixteen (16) RX sectors—sectors 1 to 16. The responder then selects one RX sector with the highest signal quality for each of the selected TX sector (e.g., RX sectors 3, 6, 8, and 15 for TX sectors 1, 9, 25, and 28 respectively).

The third step involves the final selection of the best MIMO beam combinations. The already selected four TX-RX sector pairs are based on signal quality. In order to find the best beam combinations for multiple spatial streams, the selection criteria needs to include the mutual interference or leakage between the spatial streams. After considering the mutual interference or leakage, the best two beam combinations are finally determined. For example, TX1-RX3 sector pair is selected for a first spatial stream SS#1, and TX28-RX6 sector pair is selected for a second spatial stream SS#2. In this case, the received signal power from TX1 to RX6 becomes the interference to the TX28-RX6 pair, and the received signal power from TX28 to RX3 becomes the interference to the TX1-RX3 pair. Based on both the SNR and SNIR information, the TX1-RX3 and TX28-RX6 beam combinations are the best beam combinations for MIMO SS#1 and SS#2.

Note that the second embodiment overall requires more training packets as compared to the first embodiment. From implementation perspective, the difference between the first embodiment and the second embodiment is whether the transmitting device needs to send training packets using omni-direction antenna pattern. The second embodiment does not require the implementation of semi-omni transmit antenna. In general, receiver omni-pattern is easier to form since one single antenna element would provide near omni pattern. The receiver omni-antenna gain is lower than the array antenna gain by the array gain. For transmitter, however, it is difficult to provide an omni-pattern. If a single antenna is used for generating omni-directional pattern, not only the antenna gain is reduced by the array gain but also the power gain is reduced proportional to how many power amplifiers are not used. As a result, the effective isotropic radiated power (EIRP) is reduced by array gain plus power gain.

Figure 7:
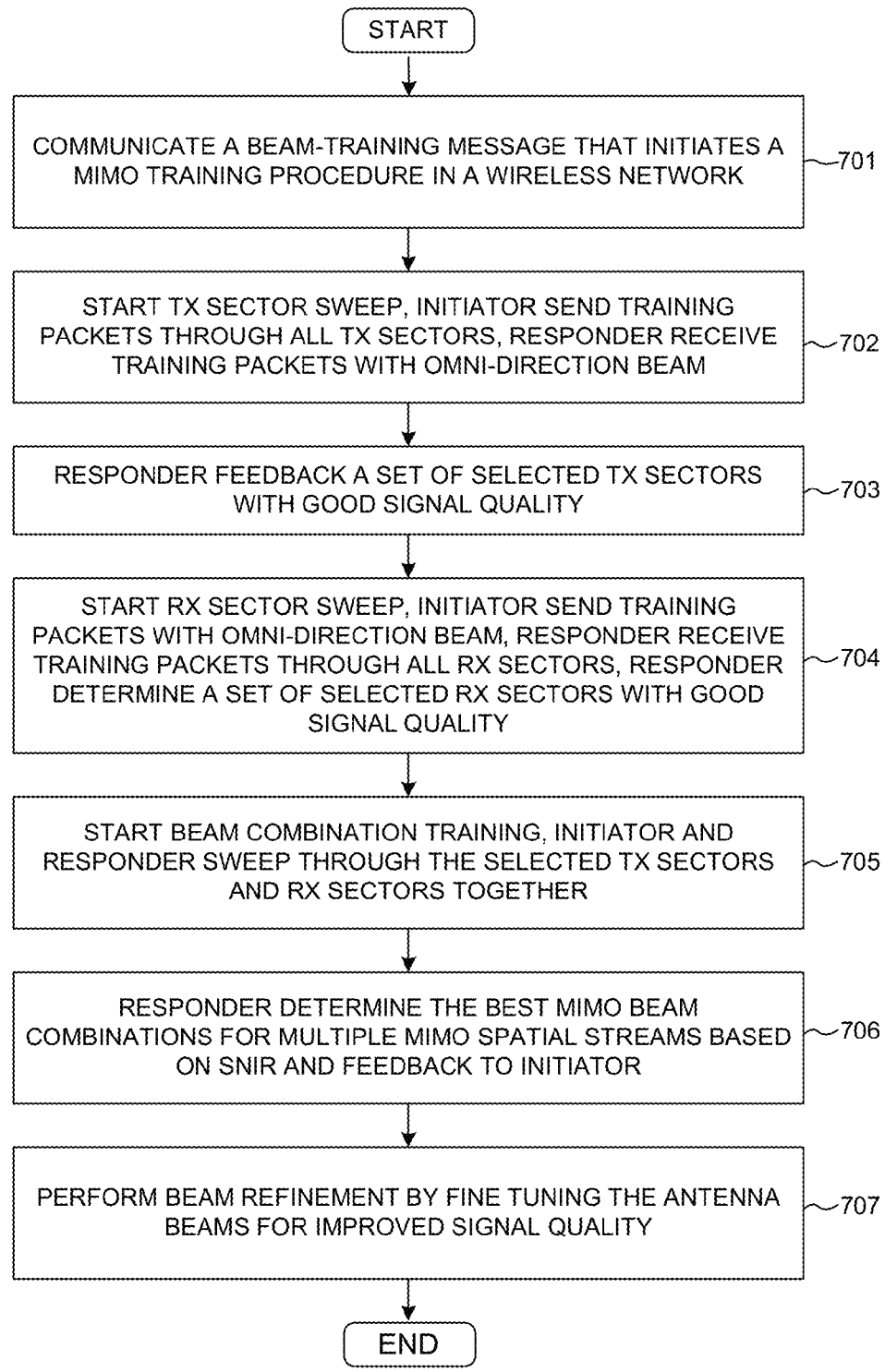
FIG. 7 is a flow chart of a first embodiment of a method of antenna beam training for MIMO operation in accordance with a novel aspect.

FIG. 7 is a flow chart of a first embodiment of a method of antenna beam training for MIMO operation in accordance with a novel aspect. In step 701, an initiator communicates with a responder a MIMO beam-training message to start a MIMO training procedure in a wireless network. The initiator is the transmitter of MIMO signal and the responder is the receiver of MIMO signal. Alternatively, the receiver of MIMO signal may also initiate the MIMO training procedure. In step 702, TX sector sweeping is started. The initiator sends training packets through all TX sectors, and the responder receives the training packets with omni-direction beam. In step 703, the responder sends a set of selected TX sectors with good received signal quality back to the initiator. In step 704, RX sector sweeping is started. The initiator sends training packets with omni-direction beam, and the responder receives the training packets through all RX sectors. The responder then determines a set of selected RX sectors with good received signal quality. In step 705, beam combination training is started. The initiator and the responder sweep through the selected TX sectors and RX sectors together. The responder records the received signal quality. In step 706, the responder determines the best MIMO beam combinations for multiple MIMO spatial streams based on signal quality and based on interference or leakage among the different spatial streams. In step 707, beam refinement is performed to fine-tune the antenna beams for improved signal quality.

Figure 8:
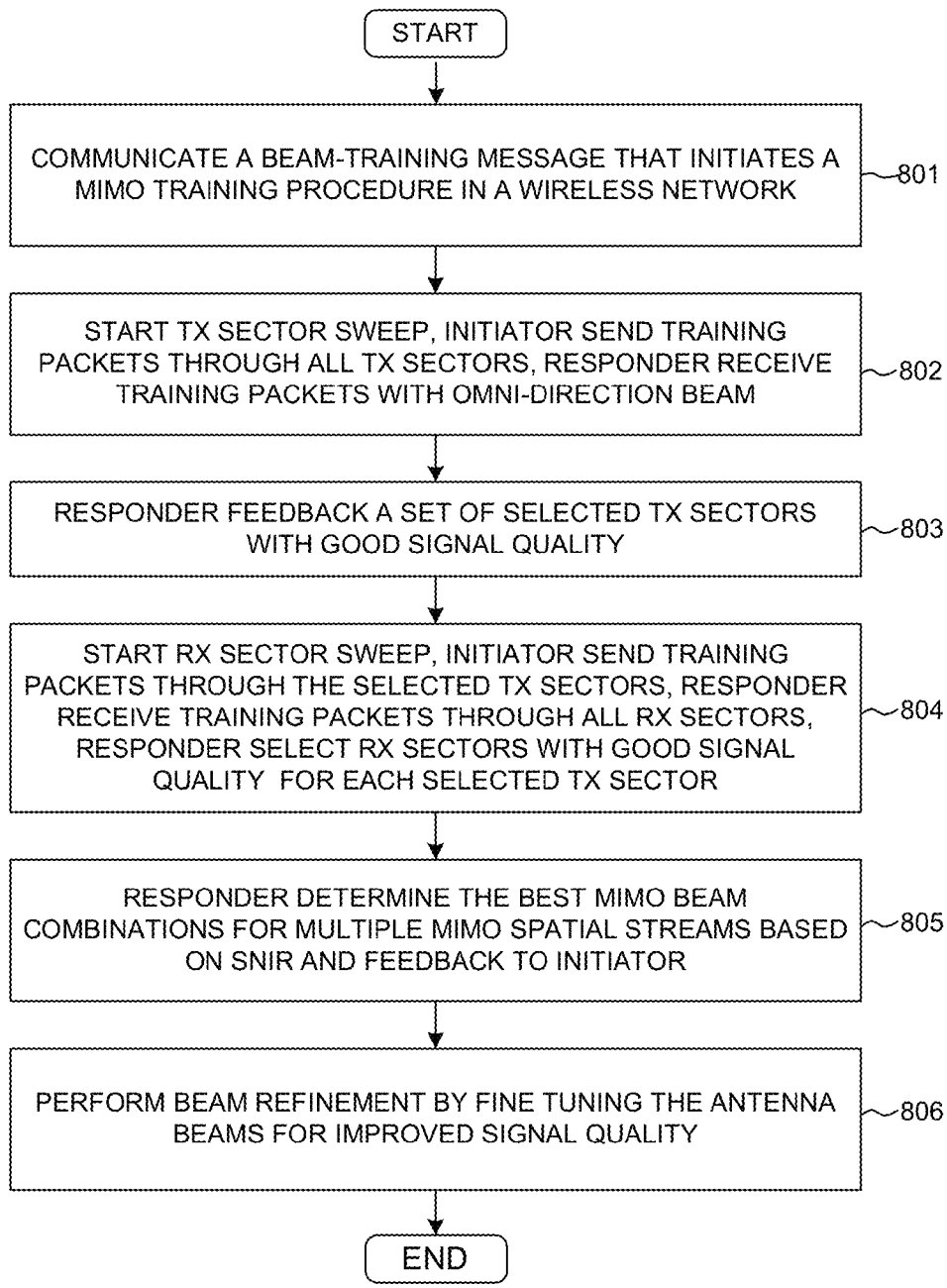
FIG. 8 is a flow chart of a second embodiment of a method of antenna beam training for MIMO operation in accordance with a novel aspect.

FIG. 8 is a flow chart of a second embodiment of a method of antenna beam training for MIMO operation in accordance with a novel aspect. In step 801, an initiator communicates with a responder a MIMO beam-training message to start a MIMO training procedure in a wireless network. The initiator is the transmitter of MIMO signal and the responder is the receiver of MIMO signal. Alternatively, the receiver of MIMO signal may also initiate the MIMO training procedure. In step 802, TX sector sweeping is started. The initiator sends training packets through all TX sectors, and the responder receives the training packets with omni-direction beam. In step 803, the responder sends a set of selected TX sectors with good received signal quality back to the initiator. In step 804, RX sector sweeping is started. The initiator sends training packets using one of the selected TX sectors, and the responder receives the training packets through all RX sectors. The initiator repeats the process for each selected TX sector. The responder then determines a set of selected RX sectors with good received signal quality for each selected TX sector. In step 805, the responder determines the best MIMO beam combinations for multiple MIMO spatial streams based on signal quality and based on interference or leakage among the different spatial streams. In step 806, beam refinement is performed to fine-tune the antenna beams for improved signal quality.

Multiple Antenna Beamforming Operation

Figure 9:
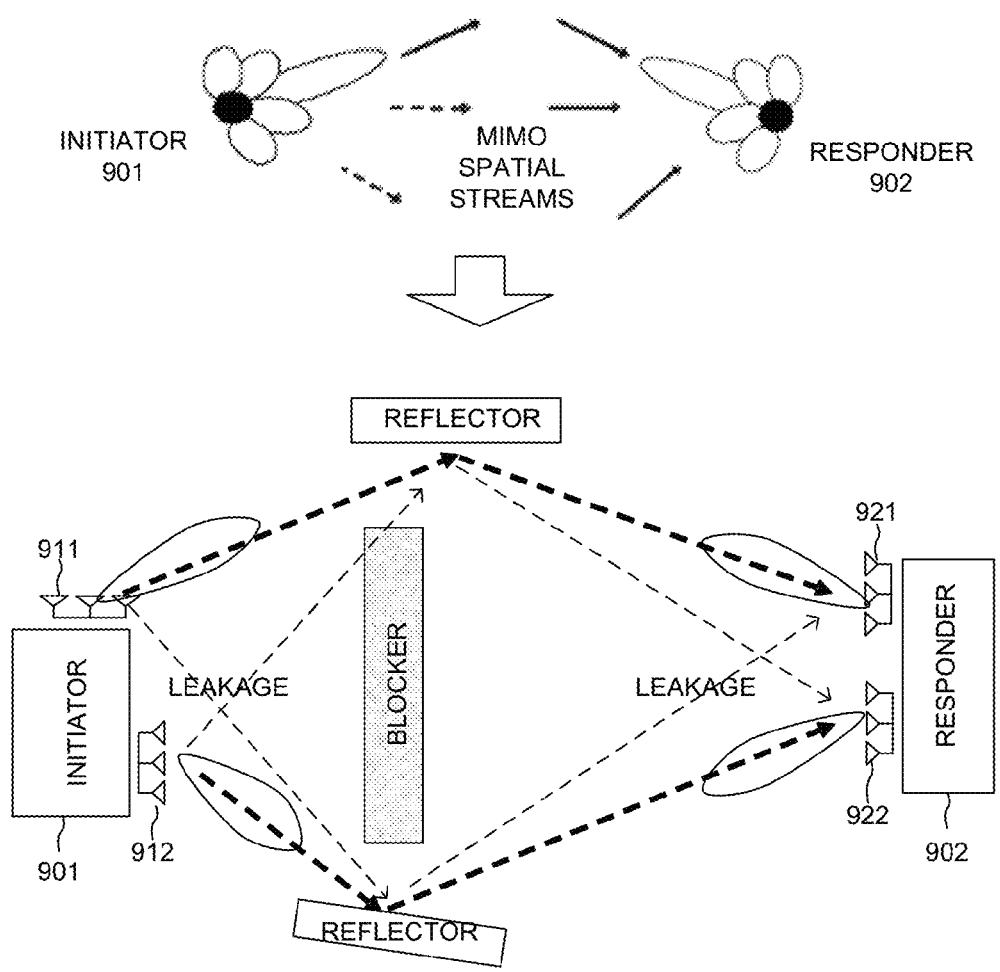
FIG. 9 illustrates MIMO transmission for IEEE 802.11ay.

In IEEE 802.11ad, the beamforming training protocol supports multiple antenna selection operation. In IEEE 802.11ay, MIMO operation is proposed to be a key feature that requires multiple antennas (or beamformers). In addition, multiple antenna beamforming operation needs to support multiple antenna TX and/or RX beamforming, when multiple antenna device communicates with single antenna device. FIG. 9 illustrates MIMO transmission for IEEE 802.11ay. In the example of FIG. 9, initiator 901 comprises multiple antenna arrays 911 and 912, and responder 902 comprises multiple antenna arrays 921 and 922. MIMO operation involves simultaneous transmission and reception of multiple spatial streams (spatial multiplexing). For N×N MIMO system, the key is to establish N independent spatial links between TX and RX antennas based on IEEE 802.11ad beamforming framework. Each array antenna is typically configured to form a single sector/beam at a time to be used for transmission or reception of a single spatial stream. IEEE 802.11ad beamforming training procedure therefore needs to be modified in such a way that no any selected TX/RX sectors come from the same TX/RX antenna or the same TX/RX beamformer. Inter-antenna leakage should also be considered in the beamforming training procedure for MIMO operation.

In one example, each spatial stream is transmitted from a TX sector of a TX antenna to an RX sector of a RX antenna and different spatial streams are transmitted from different TX antennas and received by different RX antennas. Thus, MIMO beam combination training consists of selecting N TX sector and RX sector pairs for transmitting N spatial streams. The selected N TX sectors are from N different TX antennas, and the selected RX sectors are from N RX antennas. In another example, each spatial stream is transmitted from a TX beamformer to an RX beamformer and different spatial streams are transmitted from different TX beamformers and received by different RX beamformers. Thus, MIMO beam combination training consists of selecting N TX sectors and N RX sectors for transmitting N spatial streams. The selected N TX sectors are from N different TX beamformers, and the selected RX sectors are from N RX beamformers. It is also possible to form a sector/beam from more than one antenna arrays for supporting of a spatial stream. For array antenna realization, it is also possible to attach multiple beamformers to the same set of physical antenna elements for forming multiple arrays (shared array) that can support multiple spatial streams. For the sake of convenient in discussion, we use the term "antenna" or "beamformer" to represent an apparatus that supports a spatial stream.

MIMO transmitter and receiver are capable of simultaneously transmitting or receiving through multiple antennas. Reduced the number of training frames (SSW) or fields (TRN-R and TRN-T) thus can be achieved. First, simultaneous training of multiple RX antennas can be performed by transmitting one training frame or field, and receiving simultaneously by multiple RX antennas. Second, simultaneous training of multiple TX antennas can be performed by transmitting resolvable transmit training frames or fields from multiple TX antennas simultaneously, and receiver resolving training signal from each TX antenna (e.g., each antenna transmit training frames or fields modulated by orthogonal vector, such as the row vectors in a p matrix). Third, Simultaneous training of multiple receiving STAs (MU-MIMO) can be performed by transmitting one training frame or field, and receiving simultaneously by multiple RX receiving STAs.

Specifically, in IEEE 802.11ad, a training field is transmitted for each TX sector and RX sector pair. For training receive sector with each TX sector, a total of $S_{TOTAL}$ training fields are needed, where $S_{TOTAL}$ is the total number of RX sectors across all RX antennas. For MIMO operation, however, since the N RX antennas can receive simultaneously, it is possible to transmit to multiple RX sectors simultaneously to speed up RX sector training by receiving with RX sectors belongs to different RX antennas or different RX beamformers. As a result, only a total of $S_{MAX}$ training fields are needed for each TX sector, where $S_{MAX}$ is the maximum number of RX sectors per RX antenna among N RX antennas. Note that unlike simultaneous TX sector training where the training frame or field need to be modified with orthogonal vectors, simultaneously RX sector training can employ the prior art training frame or training field provided that both transmitter and receiver know a priori about the configuration of the intended training operation.

Figure 10:
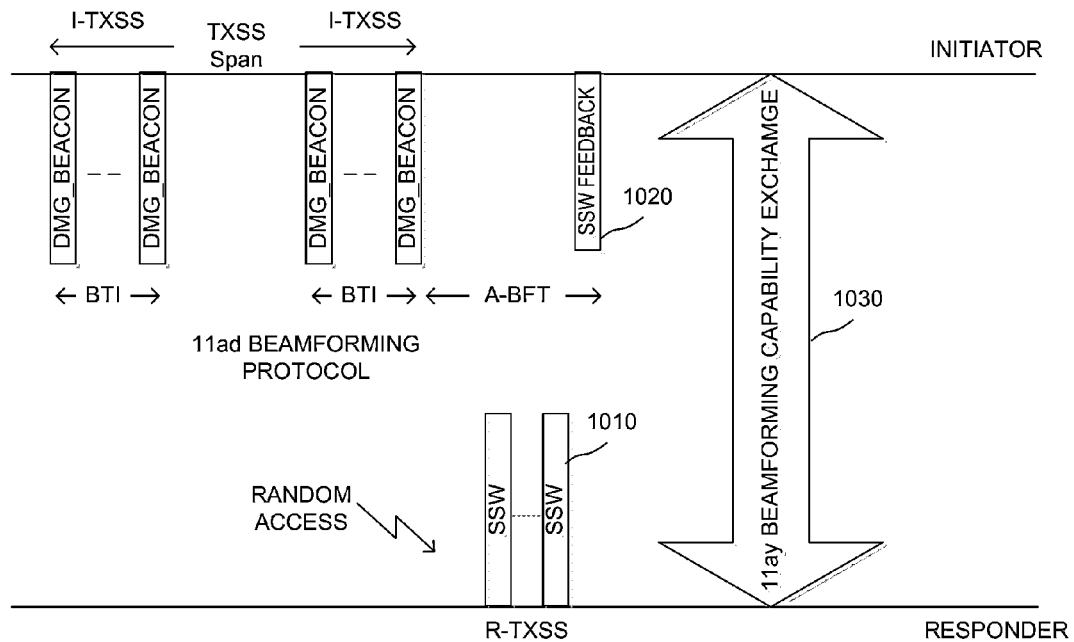
FIG. 10 illustrates a first part of beamforming training procedure for multiple antennas.

FIG. 10 illustrates a first part of beamforming training procedure for multiple antennas between an initiator and a responder. The initial operation can follow the IEEE 802.11ad beamforming protocol, called sector level sweep (SLS), to establish an initial link and then exchange IEEE 802.11ay beamforming capability. During the initiator I-TXSS, the initiator first transmits DMG beacon frames during beacon transmission interval (BTI). During the responder R-TXSS, the responder transmits sector sweep (SSW) frames and receives SSW feedback from the initiator during A-BFT. The best transmit sector is feedback to initiator via responder's SSW frames (e.g., SSW frame 1010). The best transmit sector is feedback to responder via initiator's SSW feedback frames (e.g., SSW feedback frame 1020). After the initial link is established, the initiator and the responder then performs beamforming capability exchange as depicted by step 1030, during which MIMO beamforming capabilities and parameters for multiple antenna operation are exchanged. In one example, the MIMO beamforming capabilities and parameters includes a number of TX/RX antennas, a number of TX sectors for each TX antenna, a number of RX sectors for each RX antenna, a number of MIMO spatial streams supported, a pre-determined number of MIMO beam combinations to be trained, and MIMO training capability information, e.g., whether the initiator and the responder is capable of simultaneous TX and RX training. MIMO training can start after SLS in MID/BC setup frame exchange, by explicitly request in the training frame message exchange or using an indicator in the frame.

Figure 11:
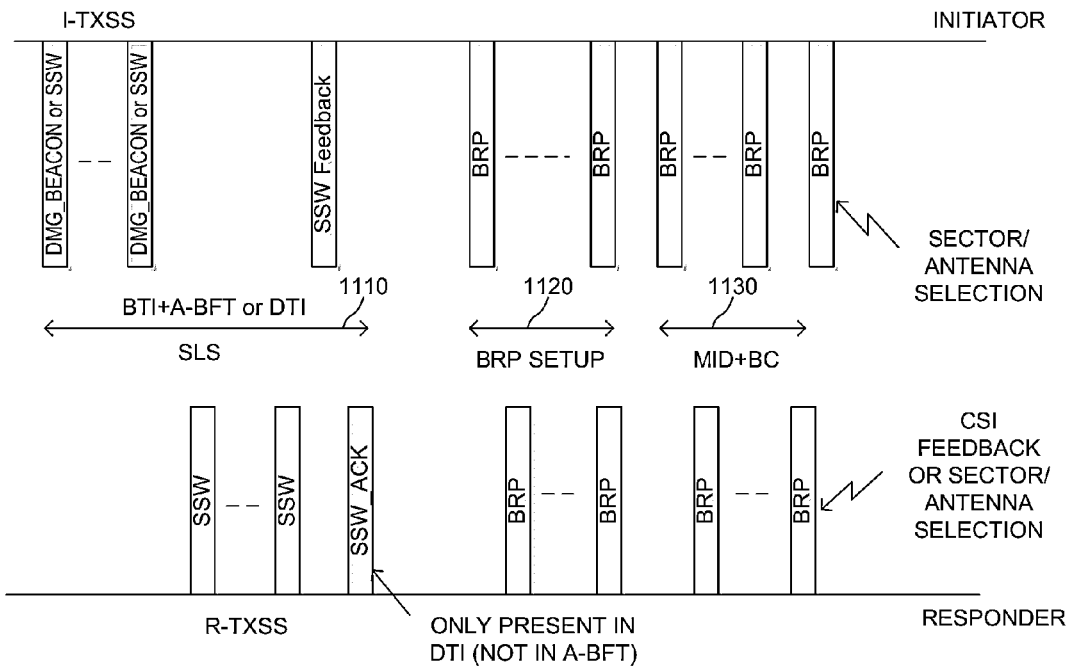
FIG. 11 illustrates a second part of beamforming training procedure for multiple antennas.

FIG. 11 illustrates a second part of beamforming training procedure for multiple antennas between the initiator and a responder. After beamforming capability exchange, there may be a sector level sweep (SLS) phase (1110), which can be performed in DTI to renew the antenna training for changing channel condition. Complete sector sweep or updating of stale sector training is performed during this SLS phase. Next is the beam refinement protocol (BRP) setup phase (1120), during which the initiator and the responder perform beam refinement transaction consisting of a series of beam refinement requests and responses. Note that during the setup phase, the initiator can request the responder to feedback channel measurements and/or selected transmit antenna sectors obtained during SLS and use this information to determine the selected TX sector for MIMO training. Next is the optional multiple antenna ID (MID) sub-phase (1130), during which RX sector training with quasi-omni TX antennas is performed. Finally, a beam combination (BC) sub-phase (1130) is performed, which includes beamforming training on the possible pairings of the selected TX sector/antennas and the selected RX sector/antennas, followed by CSI feedback or sector/antenna selection.

The beamforming training protocol here described should be flexible to be applicable to a single channel operation as well as more flexible channel bonding (wideband, 2×, 3×, 4× bandwidth) operation. In other words, the proposed operation should support different combination of SSW, beacon, BRP frames employing single channel signal format, duplicate signal format, or wideband signal format. A preferred embodiment would be using the single channel operation for SLS (sector level training) such as during I_TXSS or R-TXSS while employing a wideband (channel bonded) frame (waveform) for BRP frames to allow for more accurate channel measurement or beam combination training over wideband channel. Another embodiment is to use duplicate waveform for SSW or beacon for SLS and employs channel bonded (wideband) for BRF frame.

Figure 12:
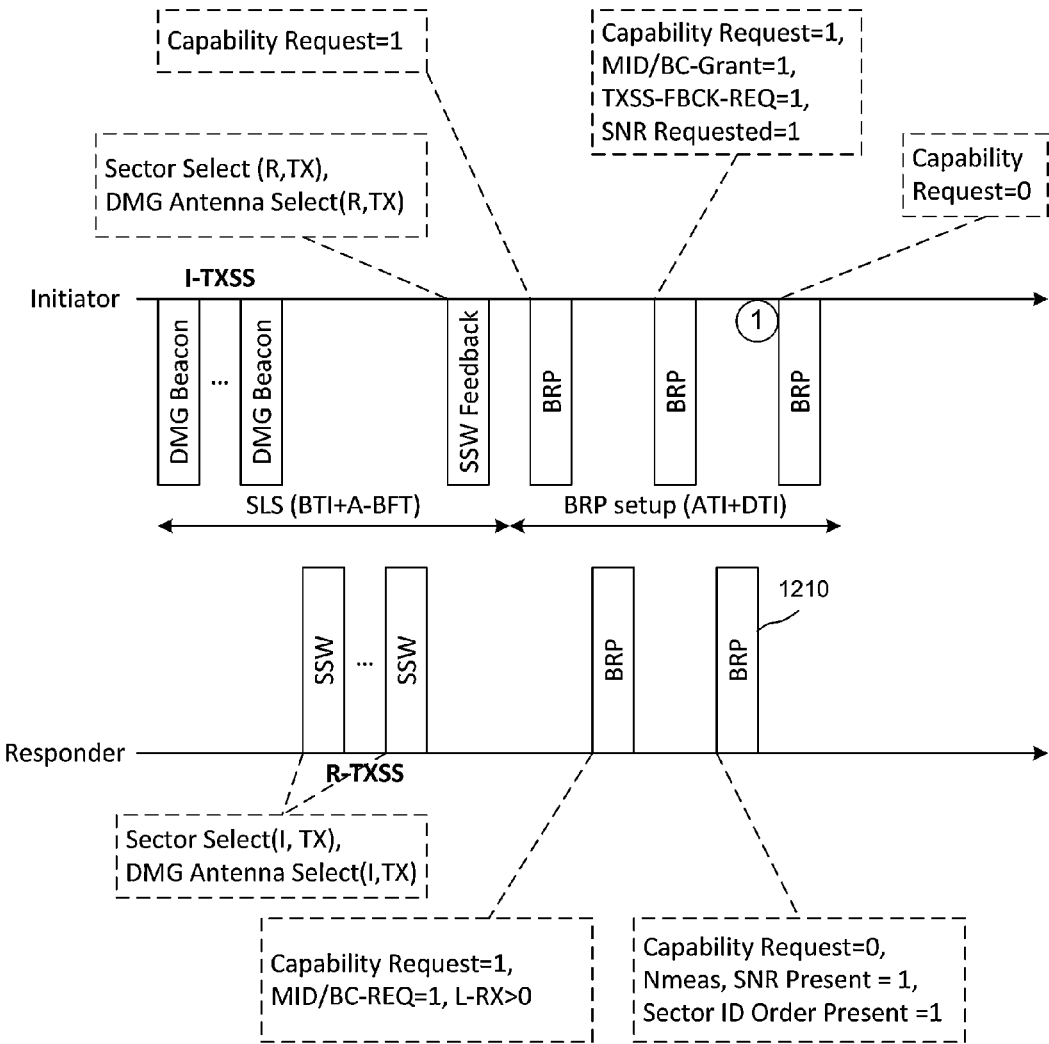
FIG. 12 illustrates one embodiment of SLS phase in BTI and A-BFT and BRP setup sub-phase.

FIG. 12 illustrates one embodiment of SLS phase in BTI and A-BFT and BRP setup sub-phase. During SLS (BTI+A-BFT), the initiator transmits through all TX sectors and indicates simultaneous RX sector training in I-TXSS. The responder receives simultaneously through all RX antennas being configured to a quasi-omni pattern. The responder then transmits through all TX sectors in R-TXSS, and the initiator receives simultaneously through all RX antennas being configured to a quasi-omni pattern. After the BRP setup sub-phase (depicted by point ① in FIG. 12), the initiator then chooses a small set of TX sectors per TX antenna based on the channel measurements or sector ID feedback from the responder (e.g., SNR feedback or sector ID contained in BRP 1210) as well as other additional information.

Figure 13:
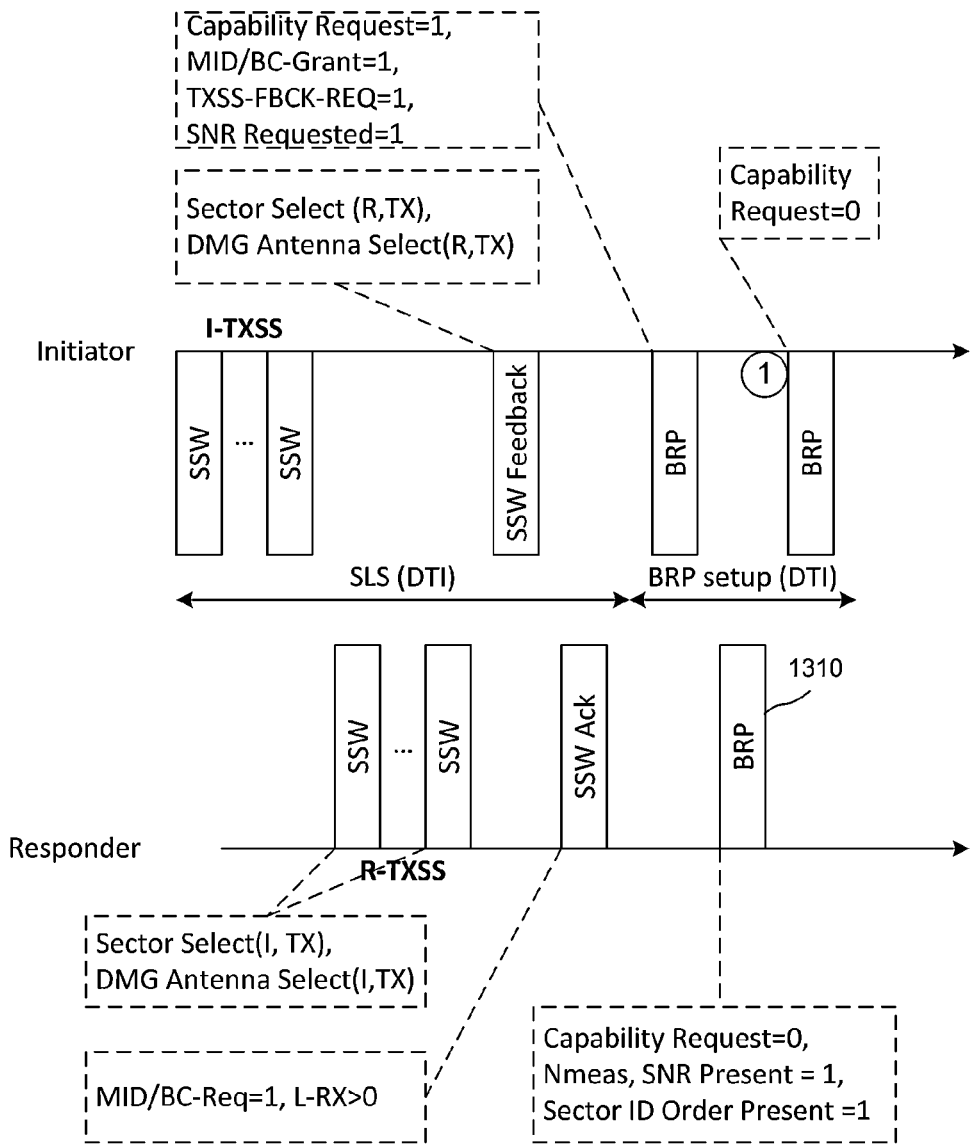
FIG. 13 illustrates one embodiment of SLS phase in DTI and BRP setup sub-phase.

FIG. 13 illustrates one embodiment of SLS phase in DTI and BRP setup sub-phase. During SLS (DTI), the initiator transmits through all TX sectors and indicates simultaneous RX sector training in I-TXSS explicitly or implicitly as agreed upon during the initial beamforming capability exchange. The responder receives simultaneously through all RX antennas being configured to a quasi-omni pattern. The responder then transmits through all TX sectors in R-TXSS, and the initiator receives simultaneously through all RX antennas being configured to a quasi-omni pattern. After the BRP setup sub-phase (depicted by point ① in FIG. 13), the initiator then chooses a small set of TX sectors per TX antenna based on the channel measurements or sector ID feedback from the responder (e.g., SNR feedback or sector ID contained in BRP 1310) as well as other additional information.

Figure 14:
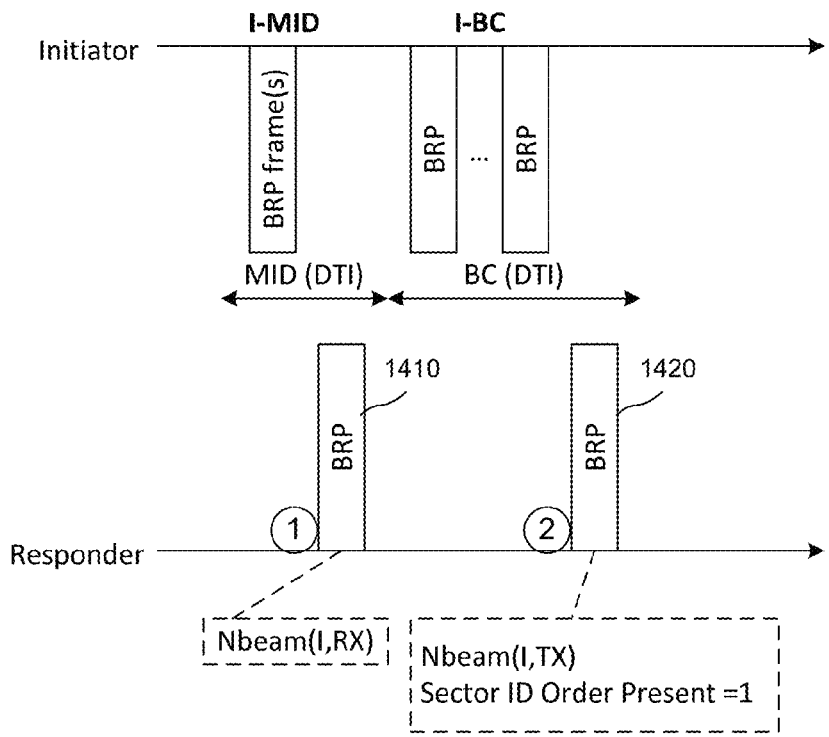
FIG. 14 illustrates a first embodiment of MIDC sub-phase with MID and BC sub-phases.

FIG. 14 illustrates a first embodiment of MIDC sub-phase with MID and BC sub-phases. During the I-MID sub-phase, the initiator first transmits BRP frames through all TX antennas being configured to a wide pattern. The responder then receives simultaneously through all RX antennas, each sweeping all RX sectors. At point ①, the responder chooses a small set of RX sectors per RX antenna based on link quality. The responder also feedbacks the number of the chosen RX sectors to the initiator (e.g., via BRP 1410). During the I-BC sub-phase, the initiator transmits BRP frames through all possible pairings from the chosen TX sectors in I-TXSS, and the responder receives simultaneously through all RX antennas, each sweeping the chosen RX sectors in I-MID. At point ②, the responder determines the best N TX/RX sector combinations (pairings) in such a way so that no any selected TX/RX sectors come from the same TX/RX antenna, and feedbacks the chosen N TX sector and RX sector pairs to the initiator (e.g., via BRP 1420). For example, the responder may use the channel measurements to compute signal-to-leakage ratio and spatial capacity (i.e., sum of each spatial stream) for determine the best TX/RX sector combinations.

Figure 15:
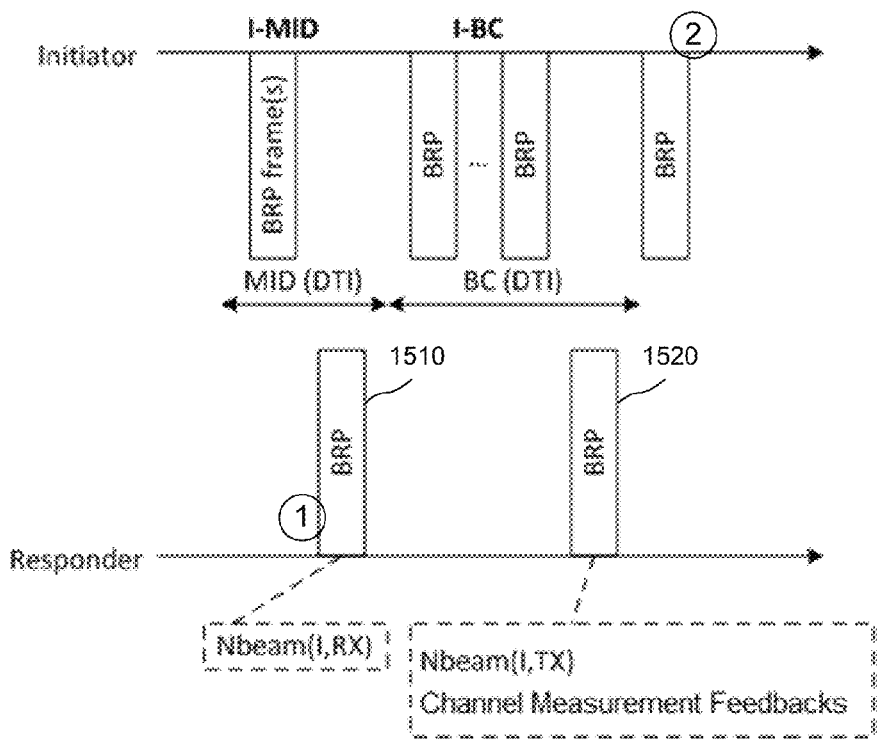
FIG. 15 illustrates a second embodiment of MIDC sub-phase with MID and BC sub-phases.

FIG. 15 illustrates a second embodiment of MIDC sub-phase with MID and BC sub-phases. During the I-MID sub-phase, the initiator first transmits BRP frames through all TX antennas being configured to a wide pattern. The responder then receives simultaneously through all RX antennas, each sweeping all RX sectors. At point ①, the responder chooses a small set of RX sector per RX antenna based on link quality (e.g., SNR) and then feedbacks the number of chosen RX sectors to the initiator (via BRP 1510). During the I-BC sub-phase, the initiator transmits BRP frames through possible pairings of the chosen TX sectors in I-TXSS, and the responder receives simultaneously through all RX antennas, each sweeping the chosen RX sectors in I-MID. The responder then feedbacks the channel measurements to the initiator (via BRP 1520). At point ②, the initiator determines the best N TX/RX sector combinations based on channel measurements in such a way so that no any selected TX/RX sectors come from the same TX/RX antenna, and feedbacks the chosen N TX sector and RX sector pairs to the responder. For example, the initiator may use the channel measurements to compute signal-to-leakage ratio and spatial capacity (i.e., sum of each spatial stream) for determine the best TX/RX sector combinations.

Figure 16A:
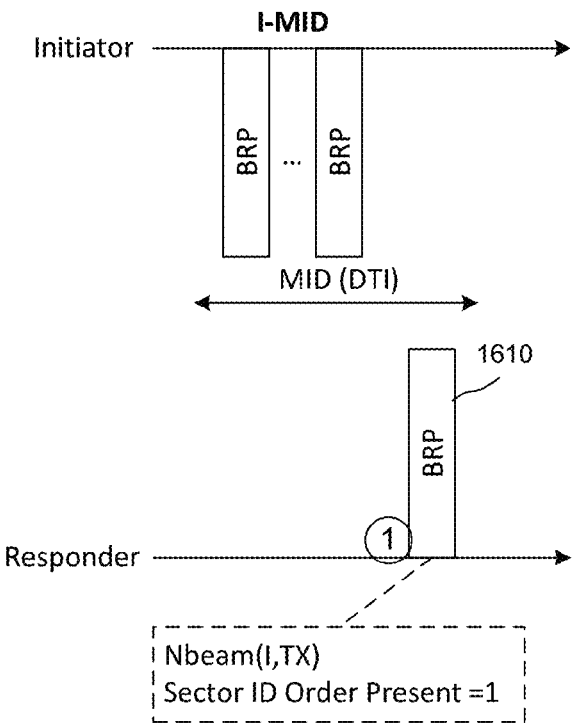
FIG. 16A illustrates a first embodiment of MID sub-phase only.

FIG. 16A illustrates a first embodiment of MIDC sub-phase with MID sub-phase only. During the I-MID sub-phase, the initiator first transmits BRP frames through all TX sectors being configured to a wide pattern. The responder then receives simultaneously through all RX antennas, each sweeping all RX sectors. At point ①, the responder determines a small set of RX sectors per RX antenna based on link quality and feedbacks the chosen RX sector to the initiator (via BRP 1610).

Figure 16B:
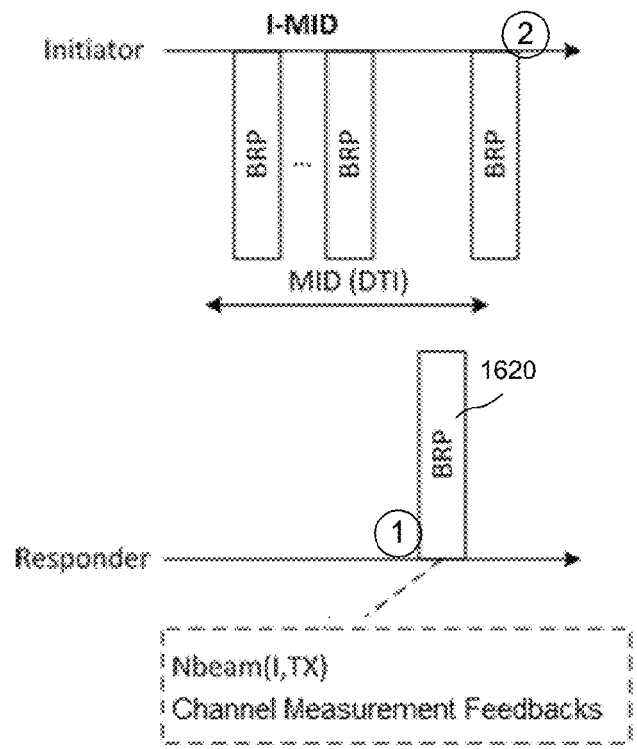
FIG. 16B illustrates a second embodiment of MID sub-phase only.

FIG. 16B illustrates a second embodiment of MIDC sub-phase with MID sub-phase only. During the I-MID sub-phase, the initiator first transmits BRP frames through all TX sectors being configured to a wide pattern. The responder then receives simultaneously through all RX antennas, each sweeping all RX sectors. At point ②, the responder feedbacks the channel measurements to the initiator (via BRP 1620). At point ②, the initiator determines a small set of RX sectors based on channel measurements, and feedbacks the chosen RX sectors to the responder.

Figure 17A:
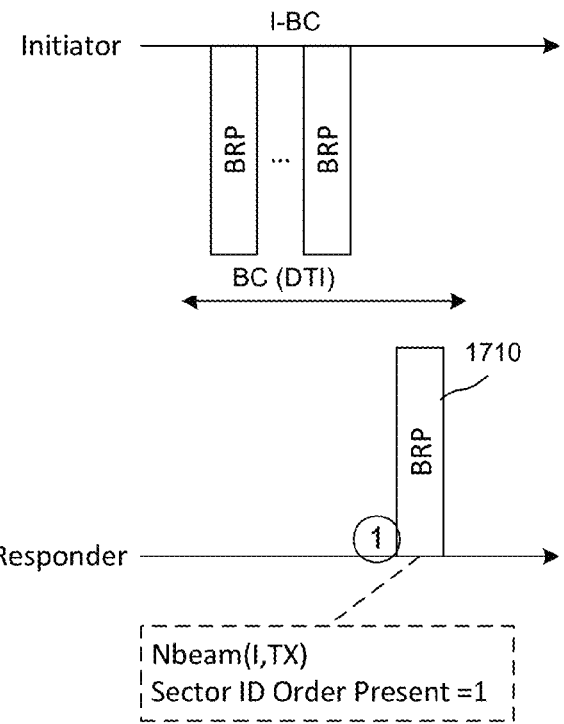
FIG. 17A illustrates a first embodiment of BC sub-phase only.

FIG. 17A illustrates a first embodiment of BC sub-phase only. During the I-BC sub-phase, the initiator first transmits BRP frames through all chosen TX sectors in I-TXSS. The responder then receives simultaneously through all RX antennas, each sweeping all RX sectors. At point ①, the responder determines the best N TX/RX sector combinations in such a way so that no any selected TX/RX sectors come from the same TX/RX antenna or beamformer, and feedbacks the chosen N TX sector and RX sector pairs to the initiator (via BRP 1710).

Figure 17B:
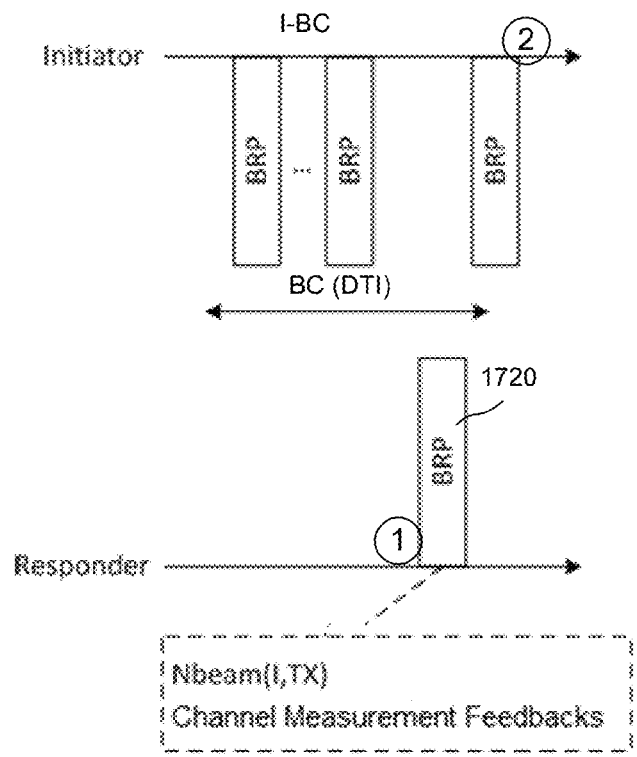
FIG. 17B illustrates a second embodiment of BC sub-phase only.

FIG. 17B illustrates a second embodiment of BC sub-phase only. During the I-BC sub-phase, the initiator first transmits BRP frames through all chosen TX sectors in I-TXSS. The responder then receives simultaneously through all RX antennas, each sweeping all RX sectors. At point ①, the responder feedbacks the channel measurements to the initiator (via BRP 1720). At point ②, the initiator determines the best N TX/RX sector combinations based on channel measurements in such a way so that no any selected TX/RX sectors come from the same TX/RX antenna or beamformer, and feedbacks the chosen N TX sector and RX sector pairs to the responder. For example, the initiator may use the channel measurements to compute signal-to-leakage ratio and spatial capacity (i.e., sum of each spatial stream) for determine the best TX/RX sector combinations.

Suppose that N TX/RX sector combinations are selected as:

$$\{(k_0, l_{m_0}), (k_1, l_{m_1}), \ldots, (k_{N-1}, l_{m_{N-1}})\}$$

where $(k_i, l_{m_i})$ stands for a combination of TX sector $k_i$ of TX antenna i and RX sector $l_{m_i}$ of RX antenna $m_i$, and $m_s \neq m_t$ if $s \neq t$.

The best N TX/RX sector combinations are determined which give the highest link capacity (throughput).

Figure 18:
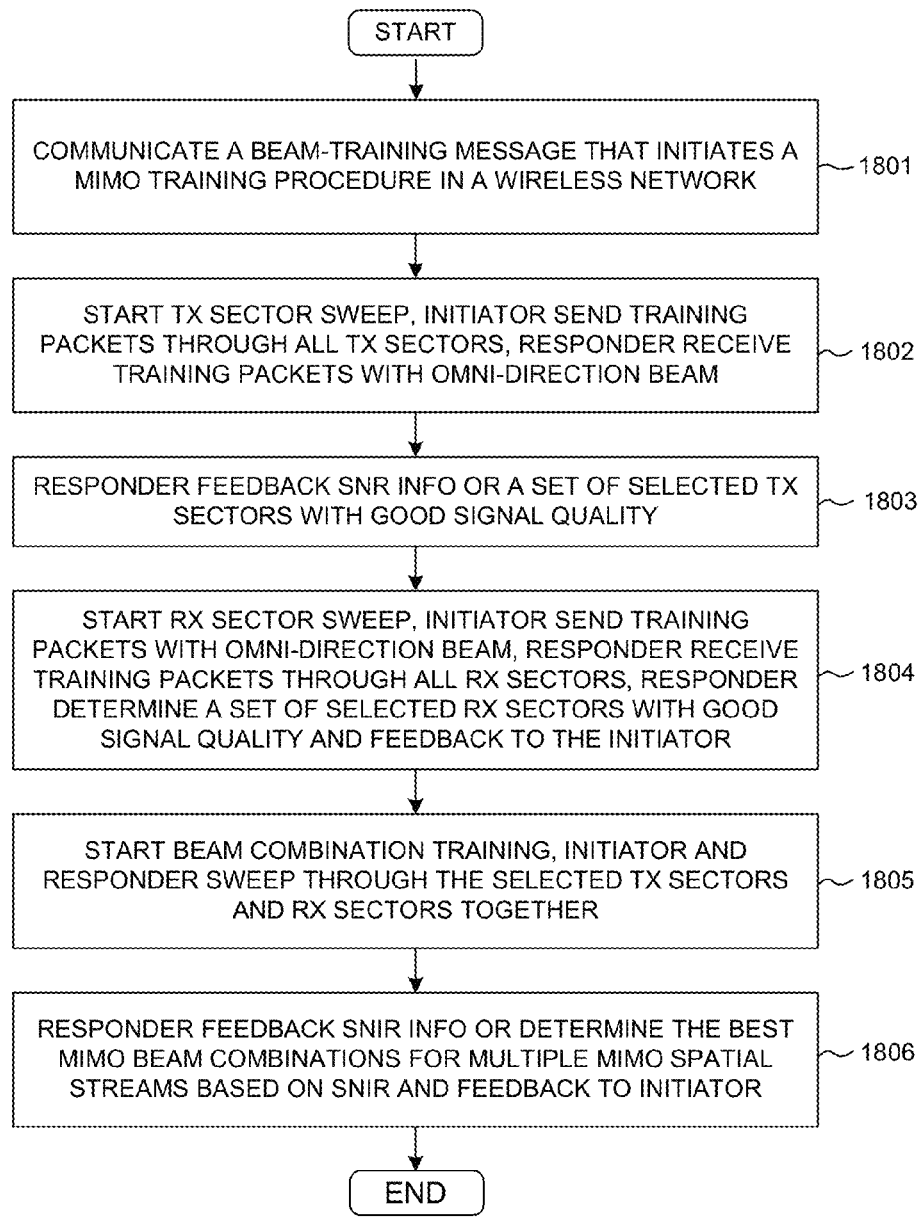
FIG. 18 is a flow chart of a first embodiment of a method of beamforming training for multiple antenna operation in accordance with a novel aspect.

FIG. 18 is a flow chart of a first embodiment of a method of beamforming training for multiple antenna operation in accordance with a novel aspect. In step 1801, an initiator communicates with a responder a MIMO beam-training message to start a MIMO training procedure in a wireless network. The initiator is the transmitter of MIMO signal and the responder is the receiver of MIMO signal. Alternatively, the receiver of MIMO signal may also initiate the MIMO training procedure. In step 1802, TX sector sweeping is started. The initiator sends training packets through all TX sectors of all TX antennas, and the responder receives the training packets simultaneously through all RX antennas with omni-direction beam. In step 1803, the responder sends a set of selected TX sectors for each TX antenna with good received signal quality back to the initiator. Alternatively, the responder may feedback the signal to noise radio (SNR) info to the initiator for TX sector selection.

In step 1804, RX sector sweeping is started. The initiator sends training packets with omni-direction beam, and the responder receives the training packets simultaneously through all RX antennas, each sweeping all RX sectors. The responder then determines a set of selected RX sectors with good received signal quality and feedback to the initiator. In step 1805, beam combination training is started. The initiator and the responder sweep through the selected TX sectors and RX sectors together. The responder records the received signal quality. In step 1806, the responder determines the best MIMO beam combinations for multiple MIMO spatial streams based on signal quality and based on interference or leakage among the different spatial streams. Alternatively, the responder may feedback the SNIR info to the initiator for the best beam combination determination. The best beam combinations are determined in such a way that no any selected TX/RX sectors come from the same TX/RX antenna or beamformers.

Figure 19:
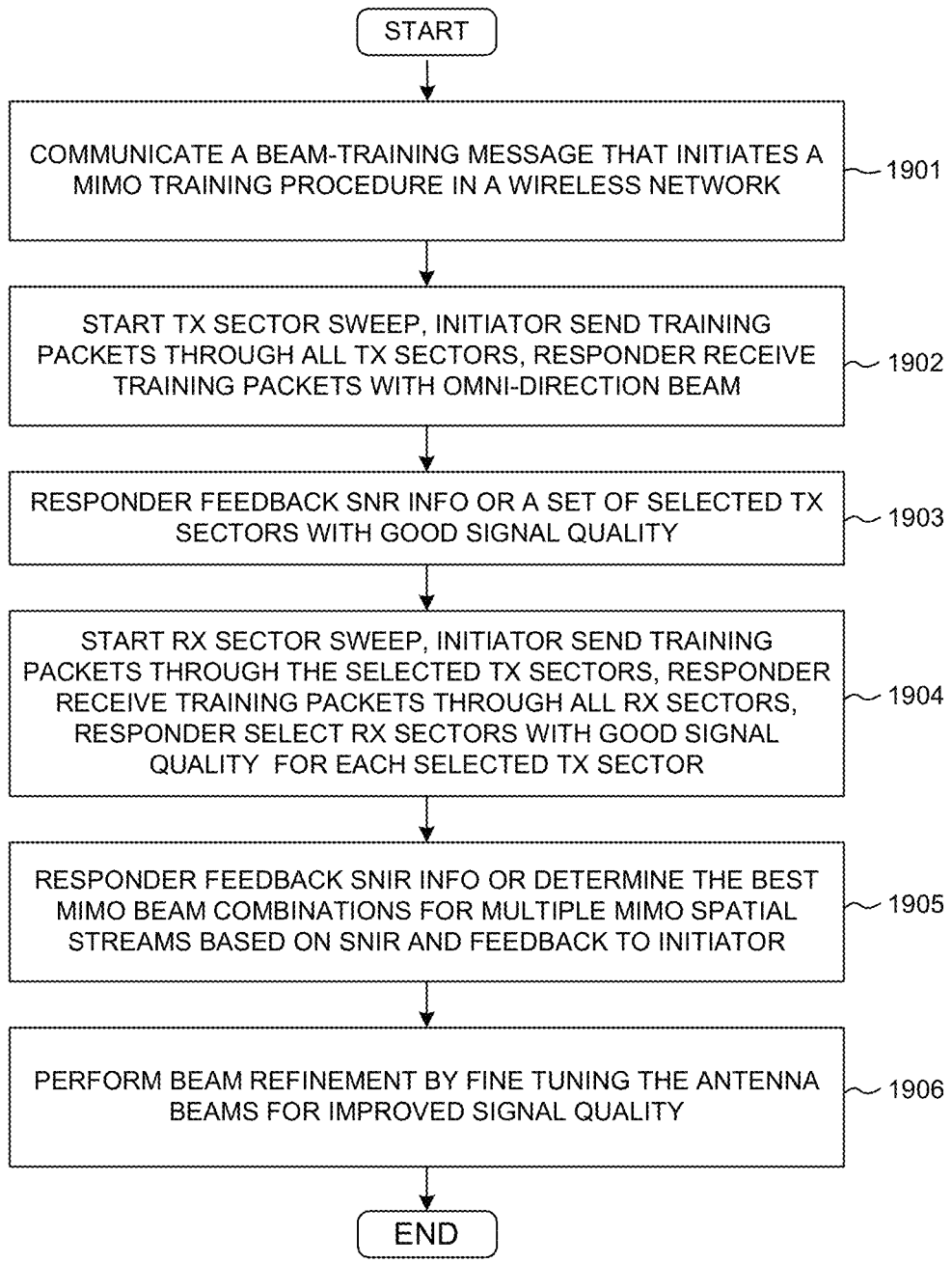
FIG. 19 is a flow chart of a second embodiment of a method of beamforming training for multiple antenna operation in accordance with a novel aspect.

FIG. 19 is a flow chart of a second embodiment of a method of beamforming training for multiple antenna operation in accordance with a novel aspect. In step 1901, an initiator communicates with a responder a MIMO beam-training message to start a MIMO training procedure in a wireless network. The initiator is the transmitter of MIMO signal and the responder is the receiver of MIMO signal. Alternatively, the receiver of MIMO signal may also initiate the MIMO training procedure. In step 1902, TX sector sweeping is started. The initiator sends training packets through all TX sectors of all antennas, and the responder receives the training packets simultaneously through all RX antennas with omni-direction beam. In step 1903, the responder sends a set of selected TX sectors for each TX antenna with good received signal quality back to the initiator. Alternatively, the responder may feedback the signal to noise ratio (SNR) info to the initiator for TX sector selection.

In step 1904, RX sector sweeping is started. The initiator sends training packets using one of the selected TX sectors, and the responder receives the training packets simultaneously through all RX antennas, each sweeping all RX sectors. The initiator repeats the process for each selected TX sector. The responder then determines a set of selected RX sectors with good received signal quality for each selected TX sector. In step 1905, the responder determines the best MIMO beam combinations for multiple MIMO spatial streams based on signal quality and based on interference or leakage among the different spatial streams. Alternatively, the responder may feedback the signal to noise ratio (SNIR) info to the initiator for beam combination determination. The best beam combinations are determined in such a way that no any selected TX/RX sectors come from the same TX/RX antenna or beamformers. In step 1906, beam refinement is performed to fine-tune the antenna beams for improved signal quality.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) initiating a multiple input and multiple output (MIMO) training procedure in a wireless network;

(b) transmitting training frames using all TX sectors during TX sector sweeping and in response obtaining a set of selected TX sectors for each TX antenna, wherein each of the TX sectors corresponds to a specific TX antenna beam;

(c) transmitting training frames using omni-direction antenna pattern during RX sector sweeping and in response obtaining a set of selected RX sectors for each RX antenna, wherein each of the RX sectors corresponds to a specific RX antenna beam;

(d) starting MIMO beam combination training based on pairings of the selected TX and RX sectors, wherein each of the MIMO beam combinations includes one of the selected TX sectors and one of the selected RX sectors; and (e) obtaining multiple best MIMO beam combinations for multiple MIMO spatial streams based on the results of the MIMO beam combination training.

2. The method of claim 1, wherein the initiating in (a) involves communicating a message that comprises parameters including a number of TX/RX antennas, a number of TX/RX sectors for each TX/RX antenna, a number of MIMO spatial streams supported, a number of MIMO beam combinations to be trained, and MIMO training capability information.

3. The method of claim 1, wherein the selected TX and RX sectors are determined based on signal to noise ratios (SNRs), and wherein the multiple best MIMO beam combinations are determined based on signal to noise plus interference ratios (SNIRs).

4. The method of claim 1, wherein one TX/RX sector is formed from multiple TX/RX antennas or beamformers.

5. The method of claim 1, wherein the training frames employ one of a single channel signal format, a duplicate signal format, and a wideband signal format.

6. The method of claim 1, wherein no TX sector of the best MIMO beam combinations is selected from the same TX antenna or TX beamformer, and wherein no RX sector of the best MIMO beam combinations is selected from the same RX antenna or RX beamformer.

7. A method comprising:
(a) initiating a multiple input and multiple output (MIMO) training procedure in a wireless network;
(b) receiving training packets using omni-direction antenna pattern during TX sector sweeping and in response determine a set of selected TX sectors for each TX antenna, wherein each of the TX sectors corresponds to a specific TX antenna beam;
(c) receiving training packets using all RX sectors during RX sector sweeping and in response determine a set of selected RX sectors for each RX antenna, wherein each of the RX sectors corresponds to a specific RX antenna beam;
(d) starting MIMO beam combination training based on the selected TX and RX sectors, wherein each of the MIMO beam combinations includes one of the selected TX sectors and one of the selected RX sectors; and
(e) obtaining multiple best MIMO beam combinations for multiple MIMO spatial streams based on the results of the MIMO beam combination training.

8. The method of claim 7, wherein the initiating in (a) involves communicating a message that comprises parameters including a number of TX/RX antennas, a number of TX/RX sectors for each TX/RX antenna, a number of MIMO spatial streams supported, a number of MIMO beam combinations to be trained, and MIMO training capability information.

9. The method of claim 7, wherein the selected TX and RX sectors are determined based on signal to noise ratios (SNRs), and wherein the multiple best MIMO beam combinations are determined based on signal to noise plus interference ratios (SNIRs).

10. The method of claim 7, wherein one TX/RX sector is formed from multiple TX/RX antennas or beamformers.

11. The method of claim 7, wherein the training packets in (b) and (c) are received simultaneously by multiple RX antennas.

12. The method of claim 11, wherein multiple subsets of selected TX sectors are determined in (b), and wherein each subset is from each RX antenna.

13. The method of claim 7, wherein no TX sector of the best MIMO beam combinations is selected from the same TX antenna or TX beamformer, and wherein no RX sector of the best MIMO beam combinations is selected from the same RX antenna or RX beamformer.

14. A method comprising:
(a) initiating a multiple input and multiple output (MIMO) training procedure in a wireless network;
(b) transmitting training packets using all TX sectors during TX sector sweeping and in response obtaining a set of selected TX sectors for each TX antenna, wherein each of the TX sectors corresponds to a specific TX antenna beam;
(c) transmitting training packets using the selected TX sectors during RX sector sweeping and in response obtaining a set of selected RX sectors for each RX antenna corresponding to each selected TX sector, wherein each of the RX sectors corresponds to a specific RX antenna beam; and
(d) obtaining multiple best MIMO beam combinations for multiple MIMO spatial streams based on channel measurement results, wherein each of the MIMO beam combinations includes one of the selected TX sectors and one of the selected RX sectors.

15. The method of claim 14, wherein the initiating in (a) involves communicating a message that comprises parameters including a number of TX/RX antennas, a number of TX/RX sectors for each TX/RX antenna, a number of MIMO spatial streams supported, a number of MIMO beam combinations to be trained, and MIMO training capability information.

16. The method of claim 14, wherein the selected TX and RX sectors are determined based on signal to noise ratios (SNRs), and wherein the best beam combinations are determined based on signal to noise plus interference ratios (SNIRs).

17. The method of claim 14, wherein one TX/RX sector is formed from multiple TX/RX antennas or beamformers.

18. The method of claim 14, wherein the training frames employ one of a single channel signal format, a duplicate signal format, and a wideband signal format.

19. The method of claim 14, wherein no TX sector of the best MIMO beam combinations is selected from the same TX antenna or TX beamformer, and wherein no RX sector of the best MIMO beam combinations is selected from the same RX antenna or RX beamformer.

20. A method comprising:
(a) initiating a multiple input and multiple output (MIMO) training procedure in a wireless network;
(b) receiving training packets using omni-direction antenna pattern during TX sector sweeping and in response determine a set of selected TX sectors for each TX antenna, wherein each of the TX sectors corresponds to a specific TX antenna beam;

(c) receiving training packets using all RX sectors during RX sector sweeping and in response determining a set of selected RX sectors for each RX antenna corresponding to each selected TX sector, wherein each of the RX sectors corresponds to a specific RX antenna beam; and (d) determining multiple best MIMO beam combinations from the selected TX and RX sectors for multiple MIMO spatial streams based on channel measurement results, wherein each of the MIMO beam combinations includes one of the selected TX sectors and one of the selected RX sectors.

21. The method of claim 20, wherein the initiating in (a) involves communicating a message that comprises parameters including a number of TX/RX antennas, a number of TX/RX sectors for each TX/RX antenna, a number of MIMO spatial streams supported, a number of MIMO beam combinations to be trained, and MIMO training capability information.

22. The method of claim 20, wherein the selected TX and RX sectors are determined based on signal to noise ratios (SNRs), and wherein the beam combinations are determined based on signal to noise plus interference ratios (SNIRs).

23. The method of claim 20, wherein one TX/RX sector is formed from multiple TX/RX antennas or beamformers.

24. The method of claim 20, wherein the training packets are received simultaneously by multiple RX antennas.

25. The method of claim 24, wherein multiple subsets of selected TX sectors are determined in (b), and wherein each subset is from each RX antenna.

26. The method of claim 20, wherein no TX sector of the best MIMO beam combinations is selected from the same TX antenna or TX beamformer, and wherein no RX sector of the best MIMO beam combinations is selected from the same RX antenna or RX beamformer.

* * * * *